US009969399B2

(12) United States Patent
Oh et al.

(10) Patent No.: US 9,969,399 B2
(45) Date of Patent: May 15, 2018

(54) VEHICLE AND METHOD OF CONTROLLING THE VEHICLE

(71) Applicant: HYUNDAI MOTOR COMPANY, Seoul (KR)

(72) Inventors: Youngchul Oh, Seongnam-si (KR); Kicheol Shin, Seongnam-si (KR); Byungyong You, Suwon-si (KR); MyungSeon Heo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/077,500

(22) Filed: Mar. 22, 2016

(65) Prior Publication Data

US 2017/0113696 A1    Apr. 27, 2017

(30) Foreign Application Priority Data

Oct. 22, 2015  (KR) .......................... 10-2015-0147082

(51) Int. Cl.
 *B60W 30/18*   (2012.01)
 *G06K 9/00*    (2006.01)
 (Continued)

(52) U.S. Cl.
 CPC ..... *B60W 30/18163* (2013.01); *G05D 1/0253* (2013.01); *G06K 9/00798* (2013.01); *G06K 9/00825* (2013.01); *G08G 1/167* (2013.01); *B60W 2420/42* (2013.01); *B60W 2550/10* (2013.01); *B60W 2550/22* (2013.01);
 (Continued)

(58) Field of Classification Search
 CPC ....... B60W 30/18163; B60W 2420/42; B60W 2550/10; B60W 2550/22; B60W 2600/00; G05D 1/0253; G05D 1/02; G05D 1/0246; G05D 1/0238; G05D 1/0257; G05D 1/0274; G06K 9/00798; G06K 9/00825; G06K 2209/23; G06K 9/32; G08G 1/167; B62D 15/026; B62D 15/0265; B62D 15/0295;
 (Continued)

(56) References Cited

U.S. PATENT DOCUMENTS 5,414,625 A  *  5/1995  Hattori ................. G05D 1/0246
                                                      180/169
6,138,062 A  *  10/2000  Usami .................. B62D 15/026
                                                      180/168
(Continued)

FOREIGN PATENT DOCUMENTS

JP        3424334 A      5/2003
JP     2013-234902 A    11/2013
 (Continued)

*Primary Examiner* — Behrang Badii
(74) *Attorney, Agent, or Firm* — McDermott Will & Emery LLP

(57) ABSTRACT

A vehicle includes a photographing unit for acquiring a plurality of images of a road, and a vehicle controller for detecting a marker on the road from the plurality of images, for deciding a first estimated position of the vehicle using an amount of change of the marker in the plurality of images, for deciding a second estimated position of the vehicle based on information about driving of the vehicle, and for deciding a final estimated position of the vehicle using the first estimated position and the second estimated position.

28 Claims, 17 Drawing Sheets

(51) Int. Cl.
*G05D 1/02* (2006.01)
*G08G 1/16* (2006.01)
*B62D 15/02* (2006.01)

(52) U.S. Cl.
CPC ....... *B60W 2600/00* (2013.01); *B62D 15/026* (2013.01); *B62D 15/0265* (2013.01); *G05D 1/02* (2013.01); *G05D 1/0246* (2013.01); *G05D 1/0274* (2013.01); *G06K 2209/23* (2013.01)

(58) Field of Classification Search
CPC .... B60R 1/00; G06T 7/73; G06T 7/60; G01C 22/00; H04N 7/181; H04N 7/18
See application file for complete search history.

(56) References Cited

U.S. PATENT DOCUMENTS

| | | | | |
|---|---|---|---|---|
| 7,421,094 | B2* | 9/2008 | Ikeda | G06T 7/733 348/119 |
| 7,489,303 | B1* | 2/2009 | Pryor | B60K 35/00 345/173 |
| 8,917,169 | B2* | 12/2014 | Schofield | B60N 2/002 340/425.5 |
| 2002/0110262 | A1* | 8/2002 | Iida | B60R 1/00 382/104 |
| 2007/0182528 | A1* | 8/2007 | Breed | B60Q 9/008 340/435 |
| 2012/0069185 | A1* | 3/2012 | Stein | G06K 9/00798 348/148 |
| 2013/0085976 | A1* | 4/2013 | Bone | B60W 30/18163 706/46 |
| 2013/0135474 | A1* | 5/2013 | Sakano | G06K 9/00791 348/148 |
| 2013/0184926 | A1* | 7/2013 | Spero | B62D 1/28 701/26 |
| 2014/0118182 | A1* | 5/2014 | Oh | G01S 13/867 342/52 |
| 2014/0136414 | A1* | 5/2014 | Abhyanker | G06Q 50/28 705/44 |

FOREIGN PATENT DOCUMENTS

| | | |
|---|---|---|
| KR | 10-2008-0084452 A | 9/2008 |
| KR | 10-2011-0029188 A | 3/2011 |
| KR | 10-2011-0060315 A | 6/2011 |
| KR | 10-1327348 B1 | 11/2013 |
| KR | 10-2014-0080105 A | 6/2014 |

* cited by examiner

VEHICLE AND METHOD OF CONTROLLING THE VEHICLE

CROSS-REFERENCE TO RELATED APPLICATION

This application claims the benefit of priority to Korean Patent Application No. 10-2015-0147082, filed on Oct. 22, 2015 with the Korean Intellectual Property Office, the disclosure of which is incorporated herein by reference.

TECHNICAL FIELD

Embodiments of the present disclosure relate to a vehicle and a method of controlling the vehicle.

BACKGROUND

A vehicle is a machine that travels on a road, tracks or on or through other surfaces or mediums to transport humans or goods to a destination. The vehicle can be designed to move using one or more wheels provided in a vehicle body to transport humans or goods. The vehicle includes, for example, a three-wheel or four-wheel vehicle, a two-wheel vehicle such as a motorcycle, construction vehicle, or bicycle.

The road can be defined as a facility laid on the ground on which vehicles or pedestrians can pass. The road can include carriage ways, bicycle paths, sideways, tunnels, bridges, and pedestrian overpasses.

On a road, one or more lanes can be provided on which vehicles can pass smoothly and safely. The lanes can be defined as areas of the road on which vehicles are allowed to pass. The lanes are divided by lines, and the lines can be safety markers that represent the boundaries of the lanes in order to separate the lanes from each other. The lines may include a line for separating vehicles traveling in the same direction, and a line for separating vehicles traveling in different directions. The vehicle can move along lanes divided by lines, or change lanes to move along another lane, according to a driver's manipulation or a predetermined setting.

SUMMARY OF THE DISCLOSURE

Therefore, it is an aspect of the present disclosure to provide a vehicle capable of accurately estimating its own relative position on a traveling lane, and a method of controlling the vehicle.

It is another aspect of the present disclosure to provide a vehicle capable of improving driving safety by accurately estimating its own relative position to stably control itself when changing a lane, and a method of controlling the vehicle.

Additional aspects of the disclosure will be set forth in part in the description which follows and, in part, will be obvious from the description, or may be learned by practice of the disclosure.

In order to achieve the aspects, a vehicle and a method of controlling the same are provided.

In accordance with one aspect of the present disclosure, a vehicle includes: a photographing unit for acquiring a plurality of images of a road; and a vehicle controller for detecting a marker on the road from the plurality of images, for deciding a first estimated position of the vehicle using an amount of change of the marker in the plurality of images, for deciding a second estimated position of the vehicle based on information about driving of the vehicle, and for deciding a final estimated position of the vehicle using the first estimated position and the second estimated position.

The vehicle controller may detect two markers from two images of the plurality of images, and acquire a difference between the two markers to thereby acquire the amount of change of the marker in the plurality of images.

The vehicle controller may decide the first estimated position of the vehicle using the amount of change of the marker, or calculate an average value of amounts of change of a plurality of markers to decide the first estimated position of the vehicle.

The vehicle controller may add a weight value to each of the amounts of change of the plurality of markers to calculate a weighted average of the amounts of change of the plurality of markers, thereby deciding the first estimated position of the vehicle.

The vehicle controller may add a greater weight value to an amount of change of a marker calculated for a detected marker located relatively closer to the vehicle in the plurality of images to calculate the weighted average of the amounts of change of the plurality of markers.

The vehicle controller may decide the final estimated position by correcting the second estimated position using the first estimated position.

The vehicle controller may acquire at least one first real marker from at least one first image among the plurality of images, and acquire at least one candidate marker based on the at least one first real marker.

The vehicle controller may decide the first estimated position of the vehicle using an amount of change of the at least one candidate marker.

A second real marker may be acquired from a second image photographed successively after the first image is photographed, among the plurality of images, and the second real marker may correspond to a first candidate marker of the at least one candidate marker.

The vehicle controller may calculate the amount of change of the marker in the plurality of images, using a difference between the first candidate marker and the second real marker, and decide the first estimated position of the vehicle using the amount of change of the marker.

The vehicle may further include a side and rear sensor for sensing another vehicle existing around a side-rear part of the vehicle.

The vehicle controller may determine whether the vehicle is able to change a lane and decide a lane changeable time period, based on the result of the sensing by the side and rear sensor.

If the vehicle controller determines whether the vehicle is able to change the lane and decides the lane changeable time period, the vehicle controller may create a lane change route.

If the vehicle controller creates the lane change route, the vehicle controller may determine whether the vehicle has departed from the lane change route, based on the final estimated position of the vehicle decided using the first estimated position and the second estimated position.

In accordance with another aspect of the present disclosure, a method of controlling a vehicle includes: deciding an estimated position of the vehicle based on information about driving of the vehicle; acquiring a plurality of images of a road; detecting a marker on the road from the plurality of images; deciding another estimated position of the vehicle using an amount of change of the marker in the plurality of images; and deciding a final estimated position of the vehicle using the estimated position and the other estimated position.

The deciding of the first estimated position of the vehicle using the amount of change of the marker in the plurality of images may include: detecting two markers from two images of the plurality of images; and acquiring a difference between the two markers to acquire the amount of change of the marker in the plurality of images.

The deciding of the other estimated position of the vehicle using the amount of change of the marker in the plurality of images may further include: deciding the other estimated position of the vehicle using the amount of change of the marker, or calculating an average value of amounts of change of a plurality of markers to decide the other estimated position of the vehicle.

The deciding of the other estimated position of the vehicle using the amount of change of the marker in the plurality of images may include deciding the other estimated position of the vehicle by adding a weight value to each of the amounts of change of the plurality of markers to calculate a weighted average of the amounts of change of the plurality of markers.

The deciding of the other estimated position of the vehicle by adding the weight value to each of the amounts of change of the plurality of markers to calculate the weighted average of the amounts of change of the plurality of markers may include deciding the other estimated position of the vehicle by adding a greater weight value to an amount of change of a marker calculated for a detected marker located relatively closer to the vehicle to calculate the weighted average of the amounts of change of the plurality of markers.

The deciding of the final estimated position of the vehicle using the estimated position and the other estimated position may include deciding the final estimated position by correcting the estimated position decided based on the information about driving of the vehicle using the other estimated position.

The deciding of the other estimated position of the vehicle using the amount of change of the marker in the plurality of images may include acquiring at least one first real marker from at least one first image among the plurality of images, and acquiring at least one candidate marker based on the at least one first real marker.

The deciding of the other estimated position of the vehicle using the amount of change of the marker in the plurality of images may further include deciding the other estimated position of the vehicle using an amount of change of the at least one candidate marker.

The deciding of the other estimated position of the vehicle using the amount of change of the marker in the plurality of images may include acquiring a second real marker from a second image photographed successively after the first image is photographed, among the plurality of images, wherein the second real marker corresponds to a first candidate marker of the at least one candidate marker.

The deciding of the other estimated position of the vehicle using the amount of change of the marker in the plurality of images may further include calculating the amount of change of the marker in the plurality of images, using a difference between the first candidate marker and the second real marker, and deciding the first estimated position of the vehicle using the amount of change of the marker.

The method may further include sensing another vehicle existing around a side-rear part of the vehicle.

The method may further include determining whether the vehicle is able to change a lane and deciding a lane changeable time period, based on the result of the sensing another vehicle existing around a side-rear part of the vehicle.

The method may further include creating a lane change route if whether the vehicle is able to change the lane is determined and the lane changeable time period is decided.

The method may further include determining whether the vehicle has departed from the lane change route, based on the final estimated position of the vehicle decided using the plurality of estimated positions.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, an embodiment of a vehicle will be described with reference to FIGS. 1 to 15.

Figure 1:
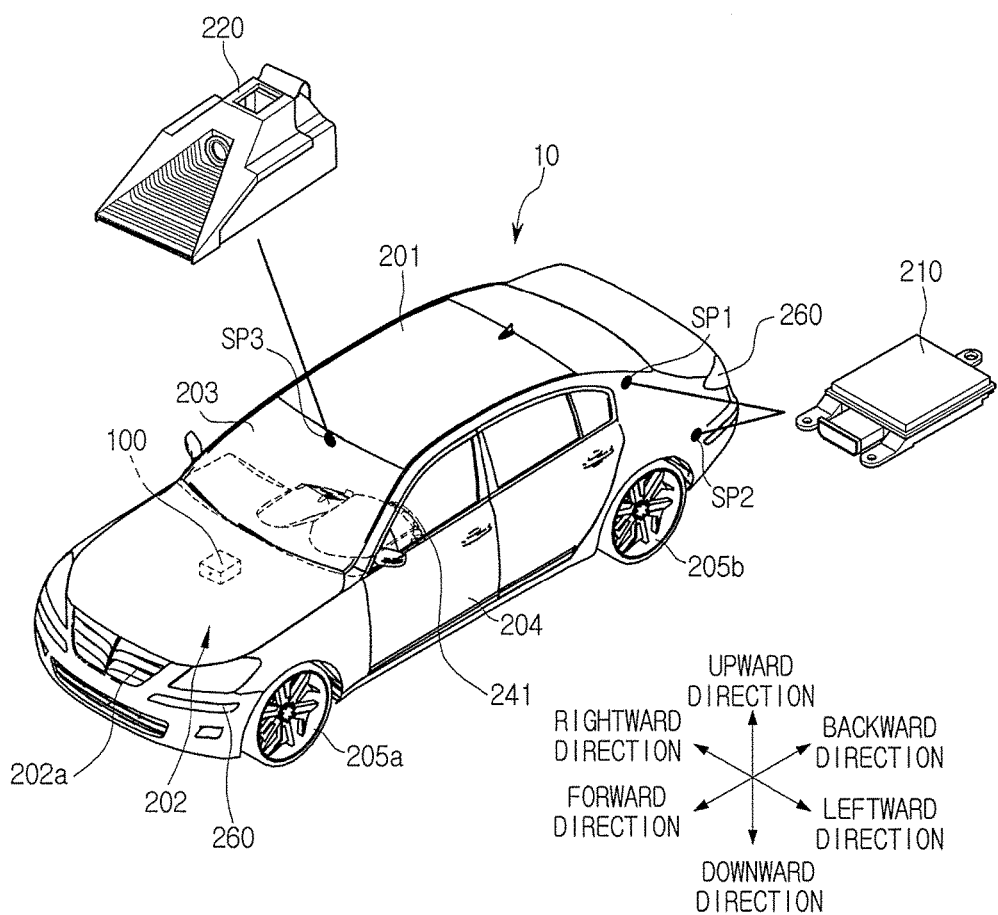
FIG. 1 shows an outer appearance of a vehicle according to an embodiment of the present disclosure.

FIG. 1 shows an outer appearance of a vehicle according to an embodiment of the present disclosure.

Hereinafter, for convenience of description, as shown in FIG. 1, a direction in which a vehicle travels is defined as a front direction, and a direction that is opposite to the front direction is defined as a rear direction. Also, side directions are divided into a left direction and a right direction with respect to the front direction. If the front direction is the 12 o'clock direction, the 3 o'clock direction or a direction around the 3 o'clock direction is defined as a right direction, and the 9 o'clock direction or a direction around the 9 o'clock direction is a left direction. Also, a direction between the side direction and the rear direction is defined as a side-rear direction, wherein a direction between the left direction and the rear direction is defined as a left rear direction, and a direction between the right direction and the rear direction is defined as a right rear direction. Also, a bottom direction with respect to the vehicle body, that is, a direction toward the ground is defined as a down direction, and a ceiling direction is defined as an up direction. A part of the vehicle extending in the front direction is defined as a front part, a part of the vehicle extending in the rear direction is defined as a rear part, and a part of the vehicle extending in the left direction or in the right direction is defined as a side part. Also, the left one of the side parts of the vehicle is defined as a left side part, and the right one of the side parts of the vehicle is defined as a right side part.

A vehicle 10 is a transport means that can travel on a road or tracks. Hereinafter, for convenience of description, the vehicle 10 is assumed to be a four-wheeled vehicle. However, the vehicle 10 is not limited to a four-wheeled vehicle. For example, the vehicle 10 may include a two-wheeled vehicle, a three-wheeled vehicle, movable construction equipment, a bicycle, and a motorcycle.

As shown in FIG. 1, the vehicle 10 may include an external frame 201 forming an outer appearance of the vehicle 10, and in the external frame 201, a windshield 203 provided in front of a driver seat and a passenger seat and configured to prevent wind from blowing into the inside of the vehicle 10, at least one door 204 configured to be opened/closed to allow a driver or a passenger to open it and get into the vehicle 10, and a plurality of wheels 205a and 205b configured to move the vehicle 10 in a predetermined direction.

The vehicle 10 may include at least one external object sensor 210 configured to sense external objects, and a photographing unit 220 configured to acquire images of a front view of the vehicle 1.

The external object sensor 210 may be installed at one or more locations sp1 and sp2 on the vehicle 10 in order to easily sense an object at a specific location. For example, the external object sensor 210 may be installed at a location at which it can properly sense another vehicle or human existing around the side-rear part of the vehicle 10. For example, the external object sensor 210 may be installed at at least one of the location sp1 on a C pillar and the location sp2 on a rear fender. In this case, in order to sense an object (for example, another vehicle) from both the left rear and right rear parts of the vehicle 10, the external object sensor 210 may be installed on both the left rear and right rear parts of the vehicle 10. More specifically, the external object sensor 210 may be installed on both the left C pillar and the right C pillar, or on both the left rear fender and the right rear fender.

The photographing unit 220 may be installed at at least one location sp3 on the vehicle 10 toward the front of the vehicle 10 in order to easily photograph a front view of the vehicle 10. For example, the photographing unit 220 may be installed at a predetermined location sp3 (for example, around a rear-view mirror) on the inside part of the windshield 203, or at a frame disposed in the inside of a radiator grill 202a.

The external object sensor 210 and the photographing unit 220 may be exposed to the outside of the vehicle 10, or installed in the inside of the external frame 201 or in the inside part of the windshield 203 so as not to be directly exposed to the outside.

In the inside of the external frame 201 of the vehicle 10, at least one vehicle controller 100 may be installed. The vehicle controller 100 may perform electronic control related to operations of the vehicle 10.

For example, if an object is sensed around the vehicle 10, the vehicle controller 100 may control a speaker provided in the vehicle 10 to output a warning sound. Also, the vehicle controller 100 may generate various control signals related to automatic driving of the vehicle 10, and transfer the control signals to the corresponding components of the vehicle 10 so that the vehicle 10 can travel automatically. In this case, the vehicle controller 100 may determine whether the vehicle 10 can change a lane, and control the vehicle 10 to change a lane, according to the result of the determination. In addition to changing a lane, the vehicle controller 100 may control various operations of the vehicle 10.

The vehicle controller 100 may be installed at an arbitrary location in the vehicle 10 according to a designer's selection. For example, the vehicle controller 100 may be installed between an engine room 202 and a dashboard, or in the inside of a center fascia in the interior of the vehicle 10. The center fascia may be located between the dashboard and a gear box, and on the center fascia, various kinds of buttons may be arranged.

The vehicle controller 100 may include a processor to receive electrical signals, to process the received electrical signals, and then to output the processed electrical signals. The processor may be implemented with at least one semiconductor chip and related components. The at least one semiconductor chip and the related components may be mounted on a printed circuit board that can be installed in the inside of the vehicle 10.

Figure 2:
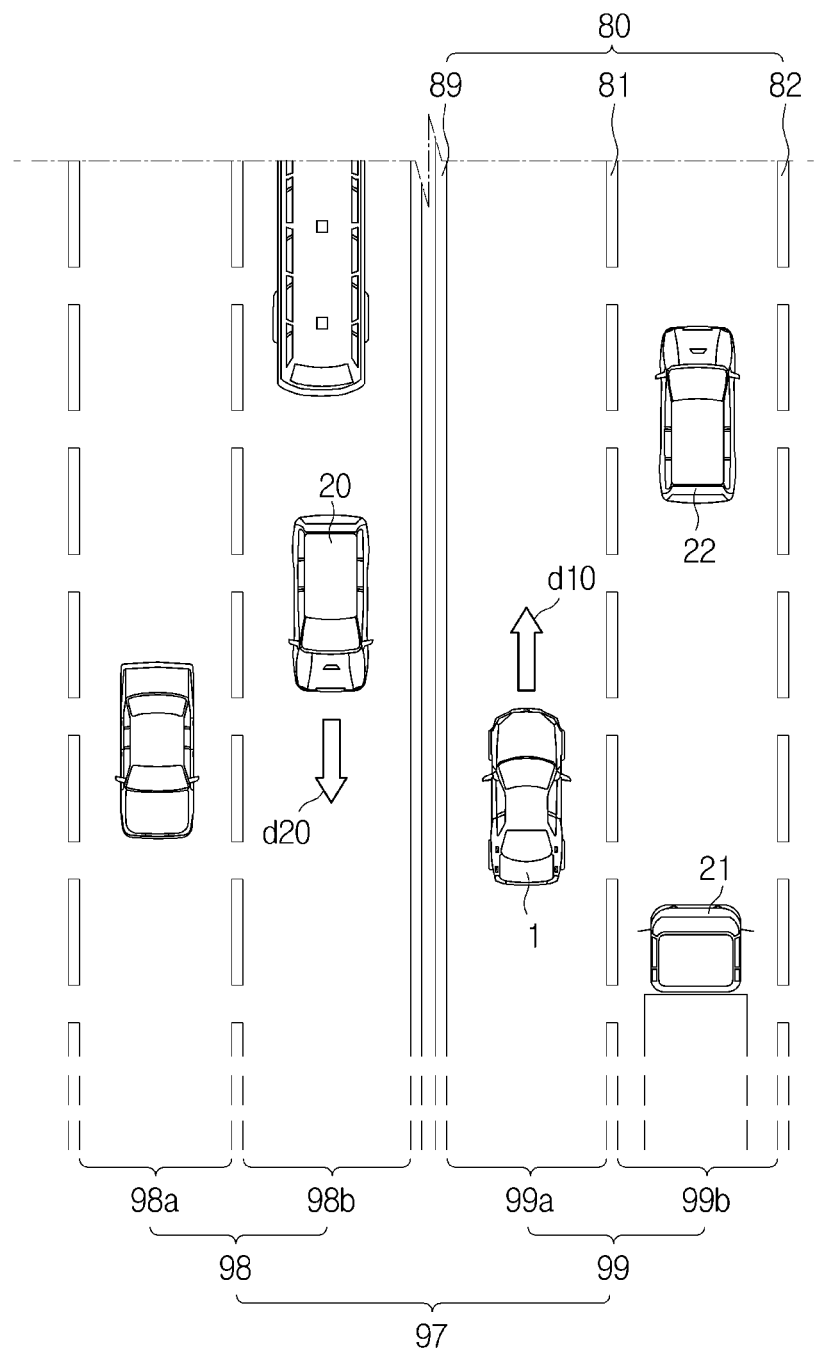
FIG. 2 is a view for describing traveling of a vehicle on a road.
Figure 3:
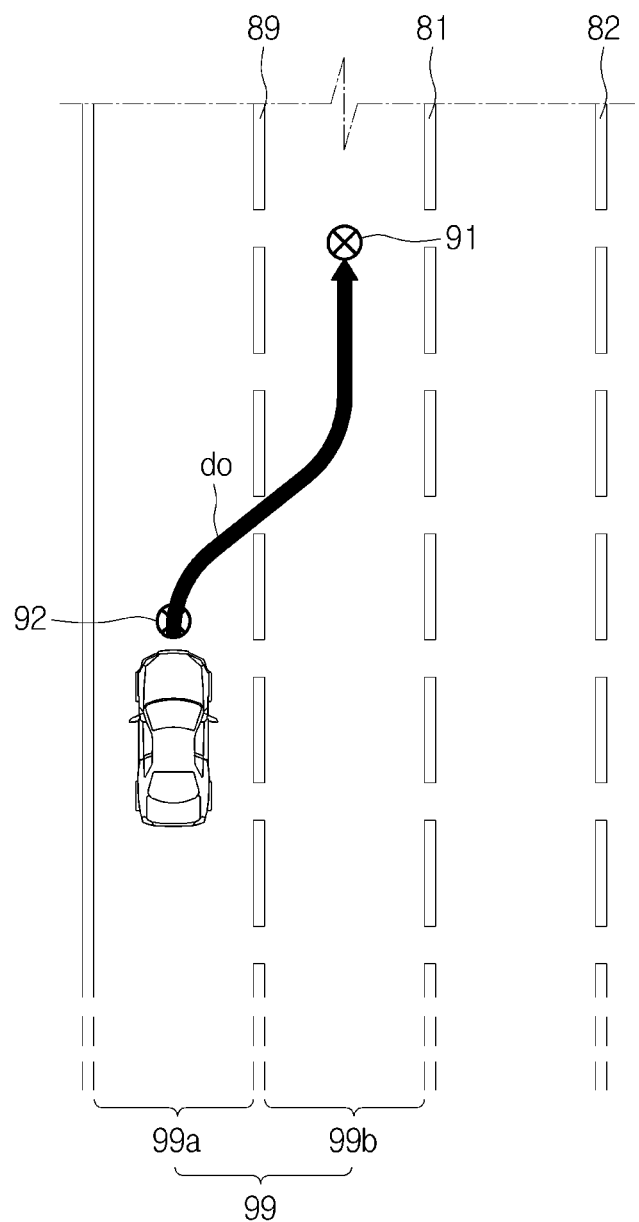
FIG. 3 is a view for describing a process in which a vehicle changes lanes.

FIG. 2 is a view for describing traveling of a vehicle on a road, and FIG. 3 is a view for describing a process in which a vehicle changes lanes.

As shown in FIG. 2, vehicles 10 and 20 may travel on a road, for example, a paved road 97. On the paved road 97, one or more lanes 99a, 99b, 98a, and 98b (also referred to as first lanes 99a and 98a and second lanes 99b and 98b) on which the vehicles 10 and 20 travel may be provided. The lanes 99a, 99b, 98a, and 98b may be divided by one or more lines 80. The lines 80 may include a central line 89 and inside lines 81 and 82. The central line 89 may divide the lanes 98 and 99 on which the vehicles 10 and 20 moving in different directions d10 and d20 travel, and the inside lines 81 and 82 may divide the lanes 99a and 99b on which vehicles 10, 21, and 22 moving in the same direction d10 travel. The inside lines 81 and 82 may be in the form of solid lines or dotted lines. If the inside lines 81 and 82 are in the form of dotted lines, the inside lines 81 and 82 may include a plurality of line elements (81a to 81c, 82a to 82c, and 83a to 83c of FIG. 9) spaced at regular intervals. The line elements 81a to 81c, 82a to 82c, and 83a to 83c may be drawn on the road 97 such that each of the line elements 81a to 81c, 82a to 82c, and 83a to 83c has a nearly rectangular shape.

Since the lanes 99a, 99b, 98a, and 98b are divided by the lines 80, the vehicles 10, 20, 21, and 22 can safely and rapidly travel on the road 97 without colliding with each other.

As shown in FIG. 3, the vehicle 10 may move, for example, from the first lane 99a to the second lane 99b located to the right of the first lane 99a to change a traveling lane. When the vehicle 10 changes a lane while running forward, the vehicle 10 may move along a S-shaped route d0 to change the first lane 99a to the second lane 99b, as shown in FIG. 3.

If the vehicle 10 is automatically driven by the vehicle controller 100, the vehicle controller 100 may set a predetermined target position 91 on the second lane 99b located to the right of the first lane 99a on which the vehicle 10 runs, set a predetermined route d0 of connecting a current position 92 of the vehicle 10 to the target position 91, and then control a steering system or an acceleration system of the vehicle 10 so that the vehicle 10 moves along the set route d0. At this time, the vehicle controller 100 may estimate or measure a position of the vehicle 10 at regular time intervals or at regular distances to determine whether the vehicle 10 properly moves along the route d0 or departs from the route d0.

According to an embodiment, the vehicle controller 100 may use dead reckoning to measure a position of the vehicle 10 when changing a traveling lane.

Figure 4:
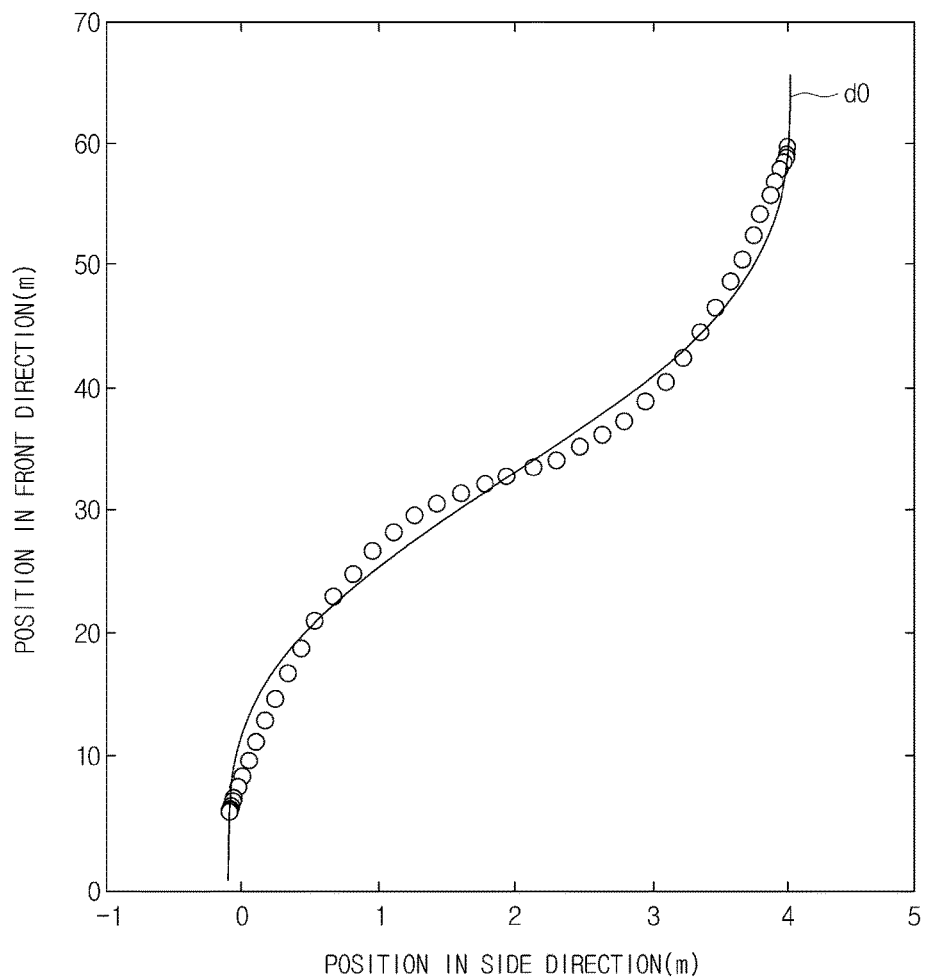
FIG. 4 is an image for describing dead reckoning.

FIG. 4 is a view, or image, for describing dead reckoning. In FIG. 4, the x axis represents a position of the vehicle 10 in a front direction from a reference point, that is, the origin, and the y axis represents a position of the vehicle 10 in a side direction from the reference point. In FIG. 4, a solid line represents the set route d0 along which the vehicle 10 needs to travel to change a traveling lane on the x-y coordinate system, and circles on the solid line represent positions of the vehicle 10 estimated using the dead reckoning.

The dead reckoning is a method of calculating a mileage and a driving direction of a vehicle for driving to a current position from an already known position to estimate a position of the vehicle. For example, when a position of a start point is given, a relative position of the vehicle 10 with respect to the start point can be calculated if driving velocity, a driving time, and a steering angle of the vehicle 10 are known. By repeatedly calculating the relative location of the vehicle 10 at regular time intervals or at regular distances, the position of the vehicle 10 can be estimated, as shown in FIG. 4. According to an embodiment, the dead reckoning may be performed by the vehicle controller 100. The dead reckoning may be used to determine whether the vehicle controller 100 properly moves along a route or departs from the route.

However, when the dead reckoning is used to estimate a position of the vehicle 10, an error may occur in an estimated position of the vehicle 10. For example, when the position of the vehicle 10 is estimated at excessively long time intervals, or when the vehicle 10 runs for a too long time or a too long distance, an actual position of the vehicle 10 may become different from an estimated position of the vehicle 10 estimated by dead reckoning. Also, when driving velocity of the vehicle 10 is inaccurately measured, or when the vehicle 10 has failure, such as a balance problem due to tire wear or distortion of a wheel alignment, an actual position of the vehicle 10 may become different from an estimated position of the vehicle 10 estimated by dead reckoning since driving velocity, a driving time, and a steering angle that are used by the vehicle controller 100 for calculation become inaccurate, which may produce an error in position estimation. Such an error in position estimation of the vehicle 10 during automatic driving may cause an accident. Accordingly, the vehicle controller 100 may additionally use data acquired by the photographing unit 220 to correct an error in position estimation of the vehicle 10 that may be generated when the position of the vehicle 10 is decided using only dead reckoning.

Meanwhile, when a position of the vehicle 10 is estimated using dead reckoning, the Kalman filter may be used to more accurately estimate a position of the vehicle 10. The Kalman filter is a recursive filter to estimate a current value based on a previously estimated value (estimation operation) and to calculate an accurate state based on the estimated value and a currently measured value (update operation). The Kalman filter may repeatedly perform the estimation operation and the update operation to estimate a current state, and in order to estimate the current state, a Kalman gain can be calculated.

Hereinafter, the vehicle 10 including the vehicle controller 100 to estimate a position of the vehicle 10 using the photographing unit 220 and the like will be described in more detail.

Figure 5:
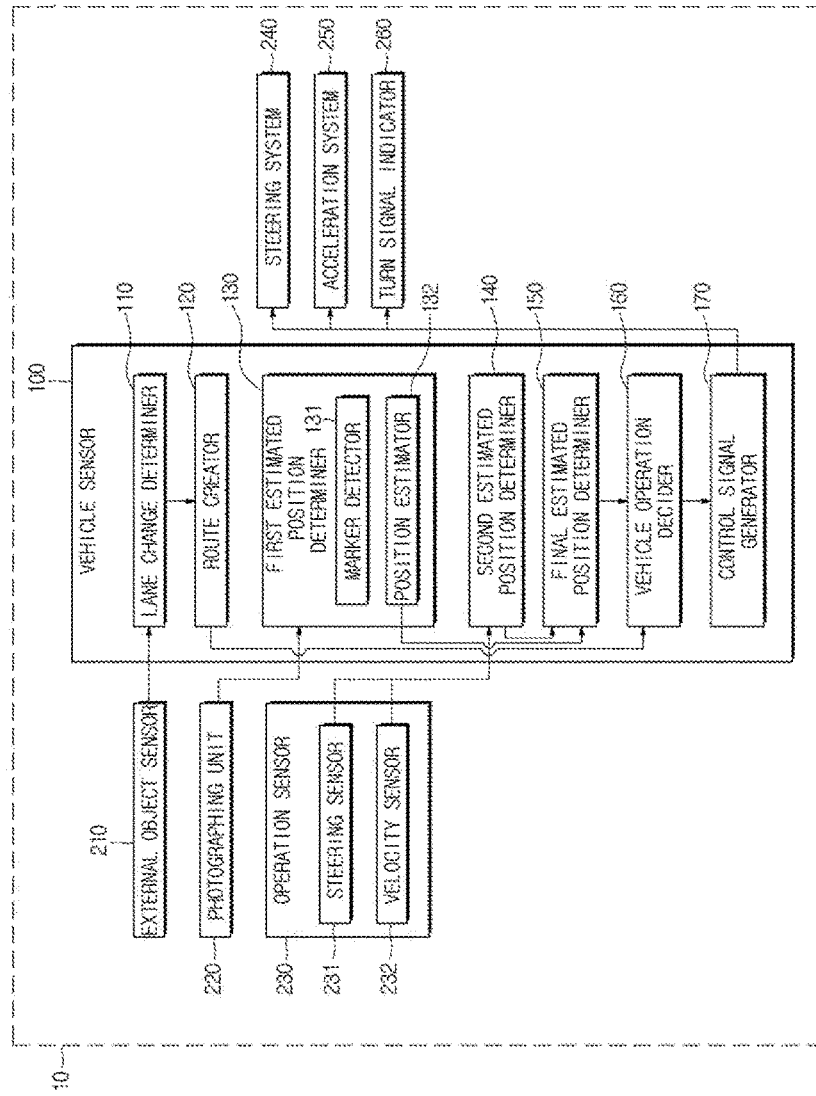
FIG. 5 is a block diagram of a vehicle according to an embodiment of the present disclosure.

FIG. 5 is a block diagram of the vehicle 10 according to an embodiment of the present disclosure.

Referring to FIG. 5, the vehicle 10 may include the vehicle controller 100, the external object sensor 210, the photographing unit 220, an operation sensor 230, a steering system 240, and an acceleration system 250. According to an embodiment, the vehicle 10 may further include a turn signal indicator 260.

The vehicle controller 100, the external object sensor 210, the photographing unit 220, the operation sensor 230, the steering system 240, the acceleration system 250, and the turn signal indicator 260 may be electrically connected to each other so as to transmit or exchange control signals or data.

In order to transmit control signals or data, the vehicle controller 100, the external object sensor 210, the photographing unit 220, the operation sensor 230, the steering system 240, the acceleration system 250, and the turn signal indicator 260 may be connected to each other through a cable or a circuit to allow data transmission, or through a wireless communication module capable of establishing a wireless communication network to allow data transmission.

In this case, the cable may be a pair cable, a coaxial cable, an optical fiber cable, or an ethernet cable.

The wired communication module may be a short-range communication module or a mobile communication module. The short-range communication module may define an apparatus capable of performing short-range communication within a predetermined distance, and short-range communication technology may be Wireless Local Area Network (WLAN), Wireless Fidelity (Wi-Fi), Bluetooth, Zigbee, Wi-Fi Direct (WFD), Ultra Wideband (UWB), Infrared Data Association (IrDA), Bluetooth low energy (BLE), or Near-Field Communication (NFC). The mobile communication module may define an apparatus capable of performing communication in a wireless communication network based on various wireless communication standards, such as 3rd Generation Partnership Project (3GPP), 3GPP2, or Worldwide Interoperability for Microwave Access (WiMAX).

However, the vehicle controller 100, the external object sensor 210, the photographing unit 220, the operation sensor 230, the steering system 240, the acceleration system 250, and the turn signal indicator 260 may transmit and/or receive data using any other communication method and apparatus.

Figure 6A:
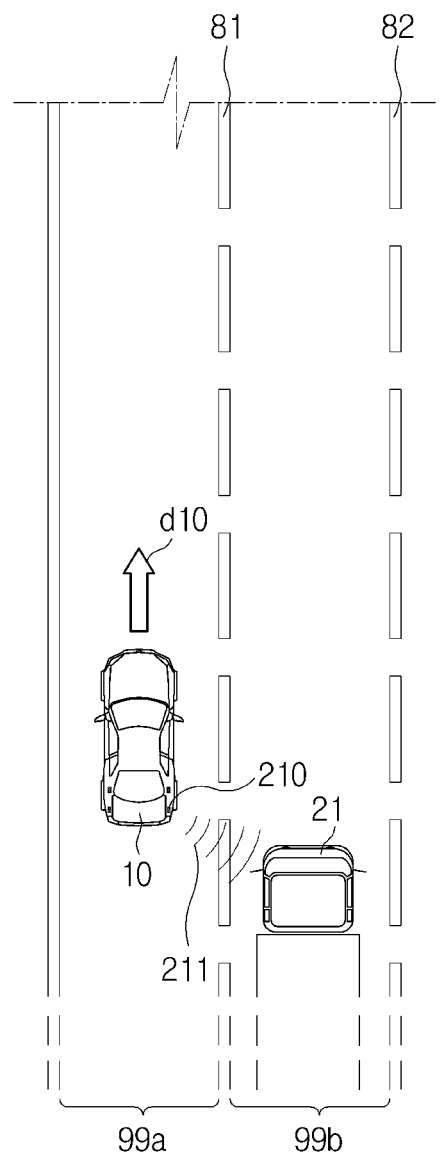
FIGS. 6A and 6B are views for describing an operation of a sensor.
Figure 6B:
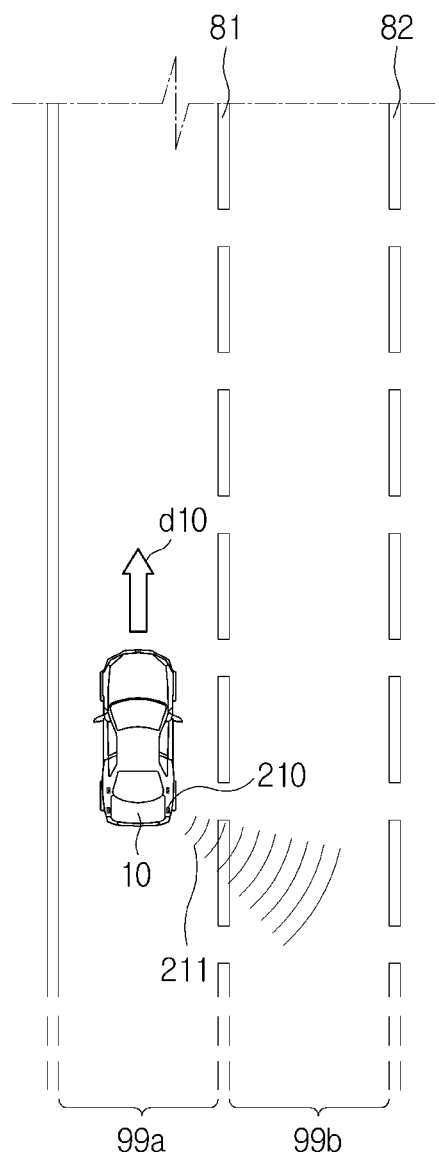

FIGS. 6A and 6B are views for describing an operation of a sensor.

The external object sensor 210 may sense whether an object 21, such as a pedestrian or another vehicle, exists around or approaches the vehicle 10. When the external object sensor 210 is installed at the location sp1 on the C pillar or at the location sp2 on the rear fender, as described above, the external object sensor 210 can sense another vehicle 21 existing around or approaching the side-rear part of the vehicle 10.

The external object sensor 210 may use electromagnetic waves, such as microwaves or millimeter waves, or predetermined medium 211 such as a laser beam to detect an object (for example, another vehicle 21) existing around or approaching the left, right, left rear, or right rear part of the vehicle 10.

For example, the external object sensor 210 may irradiate, as shown in FIGS. 6A and 6B, electromagnetic waves, a pulse laser beam, ultrasonic waves, or infrared light 211 in a left direction, a right direction, a rear direction, a left rear direction, or a right rear direction to detect an object (for example, another vehicle 21) existing around or approaching the left, right, left rear, or right rear part of the vehicle 10. If an object 21 exists in the left direction, the right direction, the rear direction, the left rear direction, or the right rear direction from the vehicle 10, as shown in FIG. 6A, the irradiated electromagnetic waves, pulse laser beam, ultrasonic waves, or infrared light 211 may be reflected from the object 21. Then, the external object sensor 210 may receive the electromagnetic waves, pulse laser beam, ultrasonic waves, or infrared light 211 reflected from the object 21 to detect an existence or approach of the object 21. If no object exists in an area to which the electromagnetic waves, pulse laser beam, ultrasonic waves, or infrared light 211 is irradiated, as shown in FIG. 6B, the electromagnetic waves, pulse laser beam, ultrasonic waves, or infrared light 211 may be not reflected. Accordingly, the external object sensor 210 cannot receive any reflected electromagnetic waves, pulse laser beam, ultrasonic waves, or infrared light 211 so as to detect no object.

Also, according to another embodiment, instead of irradiating electromagnetic waves, pulse laser beam, ultrasonic waves, or infrared light 211, the external object sensor 210 may receive visible light or infrared light reflected or scattered from the object 21 existing around the left, right, rear, left rear, or right rear part of the vehicle 10 to determine whether the object 21 exists around or approaches the vehicle 10.

The external object sensor 210 may be implemented as, for example, a radar using millimeter waves or microwaves, a lidar using a pulse laser beam, an infrared sensor using infrared light, or an ultrasonic sensor using ultrasonic waves. The external object sensor 210 may be implemented as any one of the above-mentioned devices or as a combination of two or more of the above-mentioned devices. If the vehicle 10 includes a plurality of external object sensors 210, the external object sensors 210 may be implemented as the same kind of devices or as different kinds of devices. For example, side and rear sensors disposed on the C pillar may be lidars, and side and rear sensors disposed on the rear fender may be ultrasonic sensors or infrared sensors. Also, various devices and combinations thereof that can be considered by a designer may be used to implement the external object sensor 210.

The result of sensing by the external object sensor 210 may be transferred to the vehicle controller 100, more specifically, to a lane change determiner 110 (see FIG. 5). The vehicle controller 100 may determine whether another vehicle 21 traveling along the second lane 99b exists around the left, right, rear, left rear, or right rear part of the vehicle 10, based on the result of sensing by the external object sensor 210. Meanwhile, the vehicle controller 100 may measure a time period in which electromagnetic waves, a pulse laser beam, ultrasonic waves, or infrared light 211 irradiated from the external object sensor 210 returns, and determine a distance between the vehicle 10 and the other vehicle 21 based on the measured time period.

The photographing unit 220 may photograph a front view of the vehicle 10 to acquire image data about the front view of the vehicle 10. Herein, the image data may be data for a still image or data for a moving image. The photographing unit 220 may be implemented as a camera to collect visible light or infrared light incident toward the front of the vehicle 10 to create an image. More specifically, the photographing unit 220 may include a lens and an optical sensor. The optical sensor may be implemented as a Charge Coupled Device (CCD) or a Complementary Metal-Oxide Semiconductor (CMOS). The camera may be implemented as a monocular camera or a binocular camera. Also, the camera may be implemented as a Line Departure Warning System (LDWS) camera.

The photographing unit 220 may perform photographing at predetermined time intervals to acquire a plurality of image data. In other words, the photographing unit 220 may acquire image data at predetermined time intervals. In this case, the predetermined time interval may be decided as an arbitrary time period, such as 1/30 seconds, 1/24 seconds, 1/12 seconds, 1 second, or 10 seconds, by a designer or a driver. Also, the predetermined time interval may be fixed or variable. For example, the photographing unit 220 may perform photographing every 5 seconds during normal driving, and perform photographing every second when the vehicle 10 changes a lane along a lane change route R1 (see FIG. 8).

The photographing unit 220 may output the image data acquired by photographing in the form of an electrical signal, and transfer the electrical signal to the vehicle controller 100. More specifically, the photographing unit 220 may transfer the image data to a first estimated position determiner 130 of the vehicle controller 100. The first estimated position determiner 130 may detect a marker, for example, a line 80 or at least one end of the line 80 from the image data, and calculate an amount of change of the marker using the detected line 80 or the detected at least one end of the line 80.

Figure 7:
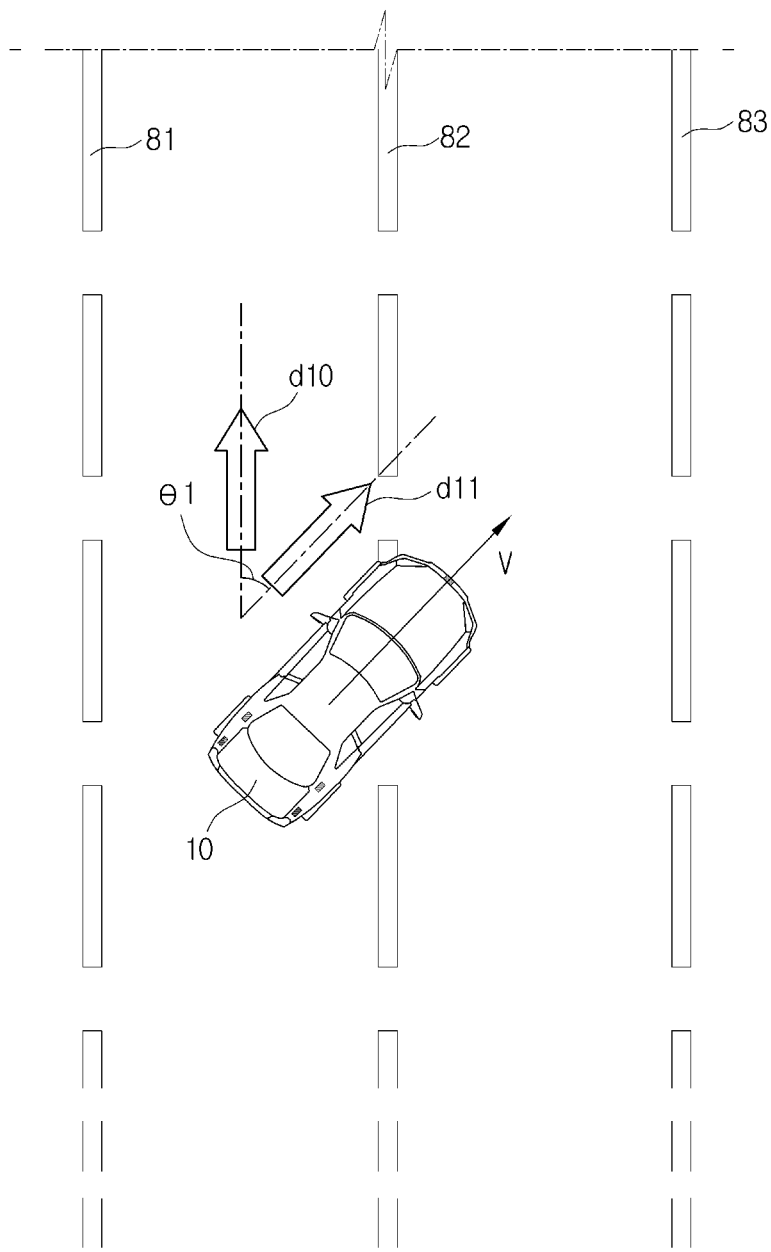
FIG. 7 is a view for describing information related to driving of a vehicle.

FIG. 7 is a view for describing information related to driving of the vehicle 10.

The operation sensor 230 may sense an operation of the vehicle 10. More specifically, the operation sensor 230 may sense a steering angle θ between a front direction d10 and a steering direction d11, and a driving velocity v of the vehicle 10, as shown in FIG. 7. Herein, the steering direction d11 means a heading direction of the vehicle 10 with respect to the front direction d10. The operation sensor 230 may further sense the steering direction d11.

In order to sense the steering angle θ and the driving velocity v of the vehicle 10, the operation sensor 230 may include a steering sensor 231 and a velocity sensor 232, as shown in FIG. 5.

The steering sensor 231 may sense at least one of the steering direction d11 and the steering angle θ of the vehicle 10.

The steering sensor 231 may be installed in the steering system 240. The steering sensor 231 may determine whether the vehicle 10 is steered by the steering system 240, and sense the steering direction d11 and the steering angle θ. In order to sense the steering angle θ, the steering sensor 231 may sense a rotation direction or a rotation angle of a component (for example, a steering wheel) of the steering system 240, rotation of a pinion gear of the steering system 240, or a movement range of a rack gear of the steering system 240. However, the steering sensor 231 may use another method and apparatus to sense at least one of the steering direction d11 and the steering angle θ of the vehicle 10.

If the steering sensor 231 senses the steering direction d11 or the steering angle θ of the vehicle 10, the steering sensor 231 may output an electrical signal corresponding to the sensed steering direction d11 or the sensed steering angle θ. The electrical signal output from the steering sensor 231 may be transferred to the vehicle controller 100.

The velocity sensor 232 may measure driving velocity v of the vehicle 10. For example, the velocity sensor 232 may use angular velocity of the wheels 205a and 205b (see FIG. 1) to sense driving velocity v of the vehicle 10, or may use a position of the vehicle 10 to sense a driving velocity v of the vehicle 10.

When the velocity sensor 232 uses angular velocity of the wheels 205a and 205b to sense driving velocity v of the vehicle 10, the velocity sensor 232 may detect rotation of a transmission output shaft to measure driving velocity v of the vehicle 10. In this case, according to an embodiment, the velocity sensor 232 may detect rotation of the transmission output shaft using an electromagnetic pickup, a hall sensor, a reed switch, or a magnetoresistive element, thereby measuring driving velocity v of the vehicle 10.

When the velocity sensor 232 uses a position of the vehicle 10 to sense a driving velocity v of the vehicle 10, the velocity sensor 232 may detect a position of the vehicle 10 using Global Positioning System (GPS), and use changes in position of the vehicle 10 for a predetermined time period to calculate a driving velocity v of the vehicle 10.

The velocity sensor 232 may output an electrical signal corresponding to the driving velocity v of the vehicle 10, and transfer the electrical signal to the vehicle controller 100, specifically, to a second estimated position determiner 140.

The vehicle controller 100 may perform a function of processing various data related to electronic control of the vehicle 10 and generating control signals, as described above. According to an embodiment, the vehicle controller 100 may determine whether the vehicle 10 changes a lane, based on electrical signals received from the external object sensor 210, the photographing unit 220, and the operation sensor 230, create a driving route of the vehicle 10, for example, a lane change route of the vehicle 10, and then generate a control signal for controlling the steering system 240 and the acceleration system 250. Also, the vehicle controller 100 may detect a position of the vehicle 10 while the vehicle 10 changes a lane, and generate a control signal for controlling the steering system 240 and the acceleration system 250 according to the position of the vehicle 10.

According to an embodiment, the vehicle controller 100 may include the lane change determiner 110, a route creator 120, the first estimated position determiner 130, the second estimated position determiner 140, a final estimated position determiner 150, a vehicle operation decider 160, and a control signal generator 170. The lane change determiner 110, the route creator 120, the first estimated position determiner 130, the second estimated position determiner 140, the final estimated position determiner 150, the vehicle operation decider 160, and the control signal generator 170 may be physically or logically separated from one another.

The lane change determiner 110, the route creator 120, the first estimated position determiner 130, the second estimated position determiner 140, the final estimated position determiner 150, the vehicle operation decider 160, and the control signal generator 170 of the vehicle controller 100 may be implemented by a single processor or two or more processors. In the latter case, the lane change determiner 110, the route creator 120, the first estimated position determiner 130, the second estimated position determiner 140, the final estimated position determiner 150, the vehicle operation decider 160, and the control signal generator 170 may be respectively implemented by separate processors.

The lane change determiner 110 may determine whether the vehicle 10 can change a lane, based on the result of sensing by the external object sensor 210. More specifically, if the external object sensor 210 determines that another vehicle 21 exists around or approaches the vehicle 10, for example, the side or side-rear part of the vehicle 10, as shown in FIG. 6A, the lane change determiner 110 may determine that the vehicle 10 cannot change a lane. In contrast, if the external object sensor 210 determines that no vehicle exists around or approaches the vehicle 10, for example, the side or side-rear part of the vehicle 10, as shown in FIG. 6B, the lane change determiner 110 may determine that the vehicle 10 can change a lane.

According to an embodiment, the lane change determiner 110 may decide a lane changeable time period, and a lane changeable time.

The lane changeable time period means a time period which the vehicle 10 can use to change a lane. In other words, the lane changeable time period may be a time period for which the vehicle 10 can change a lane. If the lane changeable time period is longer than a time period that is taken for the vehicle 10 to change the lane, the vehicle 10 can safely change the lane, and if the lane changeable time period is shorter than the time period that is taken for the vehicle 10 to change the lane, the vehicle 10 cannot safely change the lane. In the current embodiment, the time period that is taken for the vehicle 10 to change the lane may be a time period that is taken for the vehicle 10 to move from a position 92 at which the vehicle 10 starts changing the lane to a position 91 at which the vehicle 10 finishes changing the lane, along the lane change route R1 (see FIG. 8). Accordingly, whether or not the vehicle 10 can change the lane may depend on whether the lane changeable time period is long or short. The lane changeable time period may be decided as a short time period when an object, for example, another vehicle 21 exists around the side or side-rear part of the vehicle 10, and when an object, for example, another vehicle 21 is distant from the side or side-rear part of the vehicle 10 or when no object (or another vehicle 21) exists around the side or side-rear part of the vehicle 10, the lane changeable time period may be decided as a long time period. The lane change determiner 110 may decide a lane changeable time period, and compare the lane changeable time period to a predetermined threshold value to determine whether the vehicle 10 can change a lane. The predetermined threshold value may be arbitrarily decided by a designer or a user, or may be a value decided according to an experience rule.

The lane changeable time means a time at which the vehicle 10 can change a lane. In other words, the lane changeable time may be a time at which the vehicle 10 starts changing a lane. The lane change determiner 110 may decide a time at which the vehicle 10 needs to start changing a lane, according to whether an object, for example, another vehicle 21 exists around the side or side-rear part of the vehicle 10. In this case, the lane changeable time may be decided based on a time at which an object, for example, another vehicle 21 is distant from the side or side-rear part of the vehicle 10, or at which no object, for example, no vehicle exists around the side or side-rear part of the vehicle 10.

The result of determination by the lane change determiner 110 may be transferred to the route creator 120.

Figure 8:
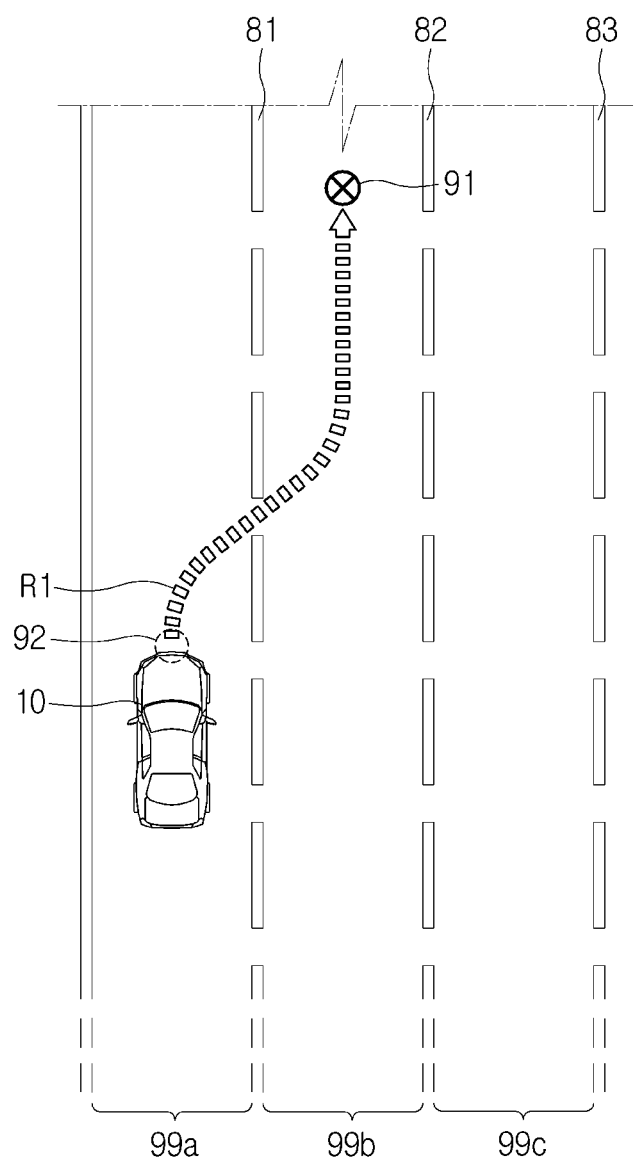
FIG. 8 shows a set lane change route.

FIG. 8 shows a set lane change route.

The route creator 120 may create a driving route of the vehicle 10, specifically, a lane change route R1 that is a route along which the vehicle 10 travels to change a lane.

If the lane change determiner 110 determines that the vehicle 10 can change a lane, the route creator 120 may decide a target position 91, and set a lane change route R1 along which the vehicle 10 moves from its current position 92 to the target position 91, as shown in FIG. 8. In this case, the route creator 120 may set a plurality of positions between the current position 92 and the target position 91, and connect the plurality of positions between the current position 92 and the target position 91 to thereby create the lane change route R1. The route creator 120 may create the lane change route R1 in a smooth curve so that the vehicle 10 can safely change a lane, as shown in FIG. 8. For example, the route creator 120 may create the lane change route R1 in an S-shaped curve. Also, the route creator 120 may create the lane change route R1 in various shapes that can be considered by a designer or a user. The route creator 120 may set the lane change route R1 according to a pre-defined setting or a user's manipulation.

If the lane change route R1 is created by the route creator 120, the created lane change route R1 may be transferred to the vehicle operation decider 160. The second estimated position determiner 140 may decide an operation of the vehicle 10 based on the lane change route R1 received from the route creator 120, and transfer information about the decided operation to the control signal generator 170. The control signal generator 170 may transfer a control signal to at least one of the steering system 240 and the acceleration system 250, according to the decided operation of the vehicle 10, and control the at least one of the steering system 240 and the acceleration system 250.

The first estimated position determiner 130 may decide a first estimated position of the vehicle 10 based on image data acquired by the photographing unit 220. The first estimated position can define an estimated position about a relative position of the vehicle 10, calculated using markers detected from images 1 and 2 (see FIGS. 10 and 12). For example, the first estimated position determiner 130 may detect at least two markers on a road from at least two images 1 and 2, and calculate an amount of change between the markers detected from the images 1 and 2, and then decide a first estimated position of the vehicle 10 based on the calculated amount of change between the markers. In this case, the markers on the road may include lines 81 to 83, specifically, the borders of the lines 81 to 83. If each line 81 to 83 has a rectangular shape having a long length and a narrow width, the border of the line 81 to 83 may include at least one of both longitudinal ends, at least one of both width-direction ends, both longitudinal ends, or both width-direction ends. If each line 81 to 83 is a dotted line, as shown in FIGS. 9 to 12, the border of the line 81 to 83 may include at least one or all of two longitudinal ends 71a to 71f, 72a to 72f, and 73a to 73c of line elements 81a to 81c, 82a to 82c, and 83a to 83c forming the lines 81 to 83, or at least one or all of two width-direction ends of the line elements 81a to 81c, 82a to 82c, and 83a to 83c forming the lines 81 to 83.

The first estimated position determiner 130 may include a marker detector 131 and a position estimator 132 (see FIG. 5) to decide the first estimated position. The marker detector 131 and the position estimator 132 may be physically or logically separated from each other.

Figure 9:
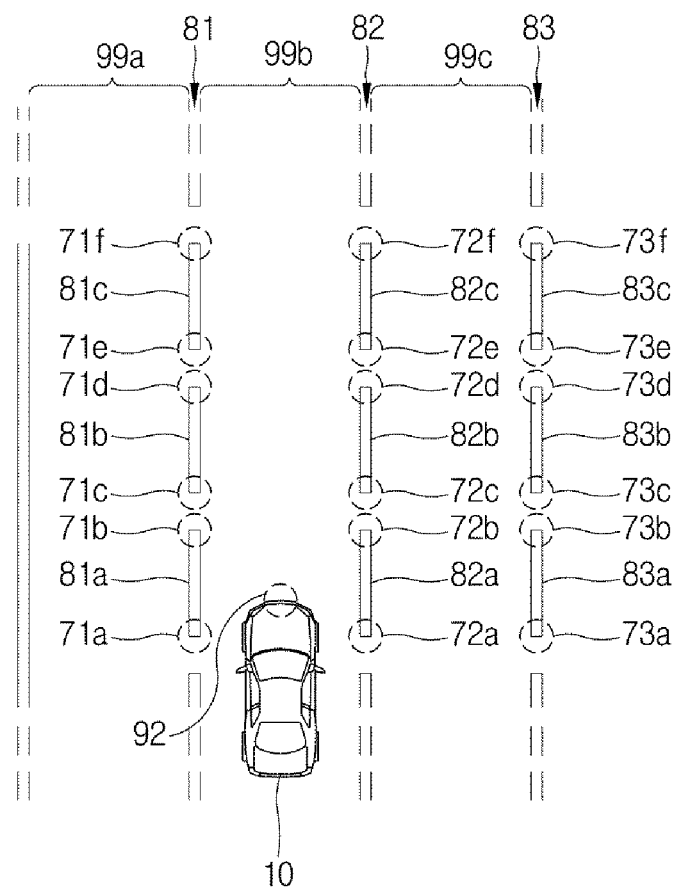
FIG. 9 is a view for describing a position of a vehicle on a road when a first image is photographed.
Figure 10:
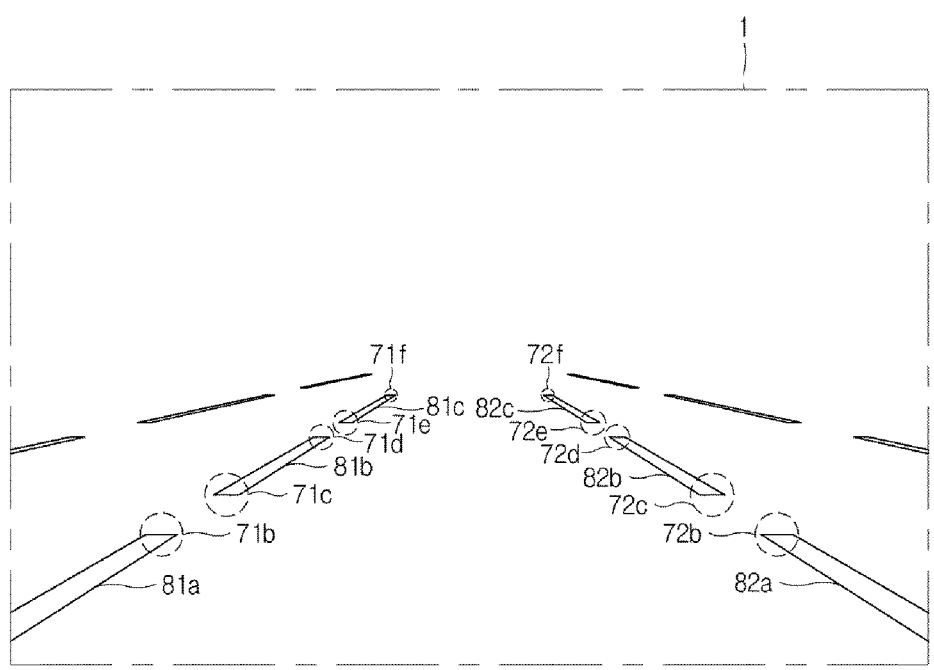
FIG. 10 shows a first image photographed by a photographing unit.
Figure 11:
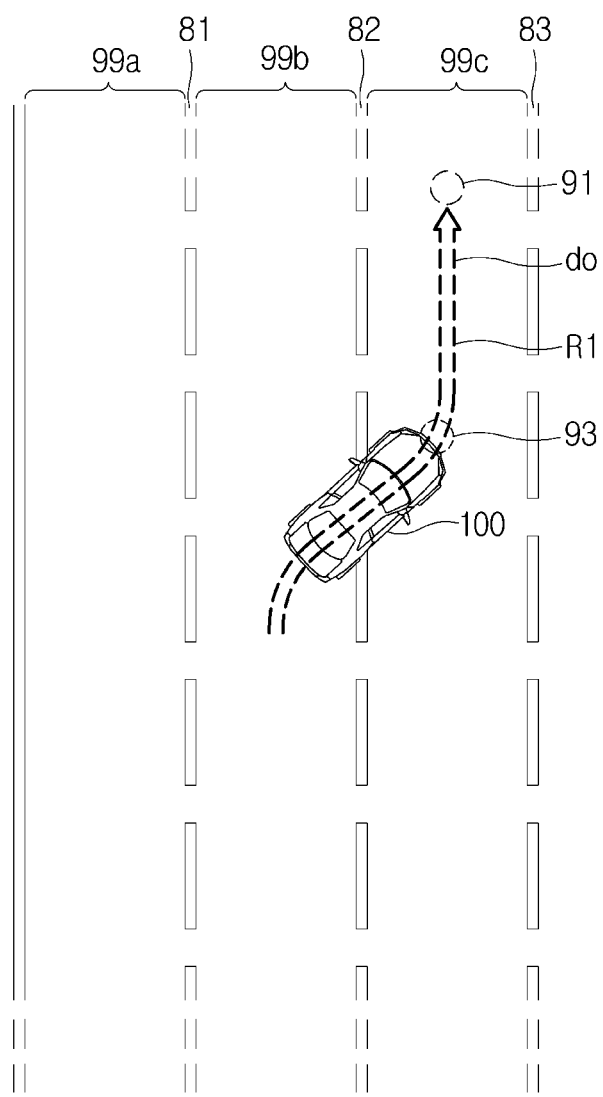
FIG. 11 is a view for describing a position of a vehicle on a road when a second image is photographed.
Figure 12:
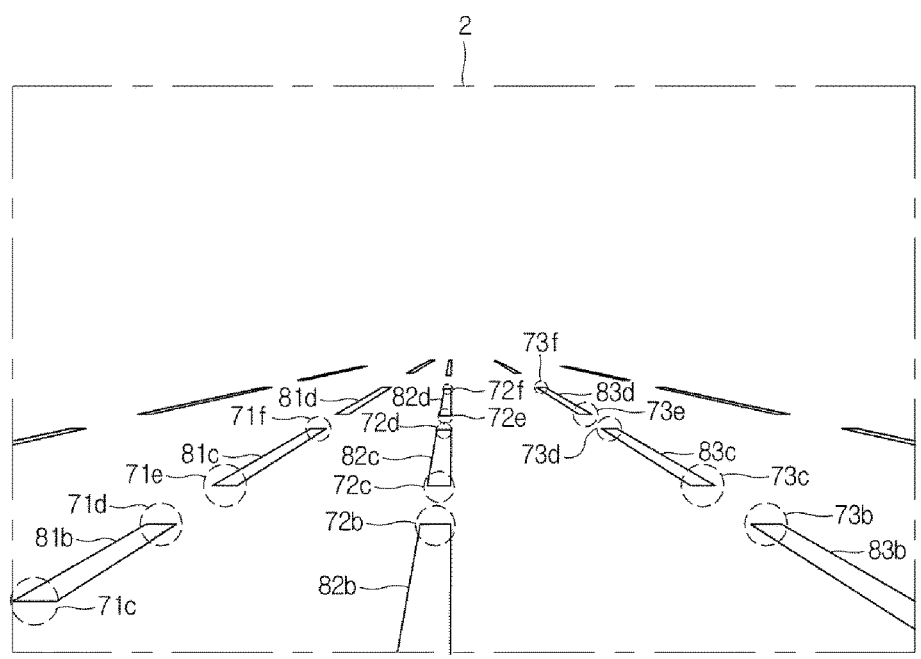
FIG. 12 shows a second image photographed by a photographing unit.

FIG. 9 is a view for describing a position of the vehicle 10 on a road when a first image is photographed, FIG. 10 shows a first image photographed by the photographing unit 220, FIG. 11 is a view for describing a position of the vehicle 10 on a road when a second image is photographed, and FIG. 12 shows a second image photographed by the photographing unit 220.

When the vehicle 10 changes a lane 99b to a lane 99c along the lane change route R1, the photographing unit 220 may continue to photograph a front view of the vehicle 10. As described above, the photographing unit 220 may perform photographing at predetermined time intervals to acquire a plurality of images. An image photographed by the photographing unit 220 at a first time is referred to as a first image 1 as shown in FIG. 10, and an image photographed by the photographing unit 220 at a second time is referred to as a second image 2 as shown in FIG. 12. For convenience of description, the first time is a time at which the vehicle 10 starts changing the lane 99b at the start position 92 of the lane change route R1, and the second time is a time at which the vehicle 10 passes through a certain position 93 when moving from the lane 99b to the lane 99c.

As shown in FIGS. 9 and 10, in the first image 1 photographed by the photographing unit 220 at the first time, markers (for example, lines 81 to 83) on a road located in front of the vehicle 10 may appear. The marker detector 131 may detect the markers (for example, the lines 81 to 83) from the first image 1 photographed by the photographing unit 220. If the lines 81 to 83 are dotted lines, the marker detector 131 may detect at least one line element 81a to 81c, 82a to 82c, or 83a to 83c forming each of the lines 81 to 83. According to an embodiment, the marker detector 131 may detect, instead of detecting the entire of the lines 81 to 83 or the entire of the line elements 81a to 81c, 82a to 82c, and 83a to 83 from the first image 1, a part of the lines 81 to 83 or a part of the line elements 81a to 81c, 82a to 82c, and 83a to 83c from the first image 1. For example, the marker detector 131 may detect only the borders 71a to 71f, 72a to 72f, and 73a to 73f of the line elements 81a to 81c, 82a to 82c, and 83a to 83c.

The marker detector 131 may detect the markers (for example, the lines 81 to 83, the line elements 81a to 81c, 82a to 82c, and 83a to 83c, or the borders 71a to 71f, 72a to 72f, and 73a to 73f) from the first image 1, using a method of extracting feature points from an image. In order to detect the markers from the first image 1, the marker detector 131 may use a predetermined feature point detection algorithm. The feature point detection algorithm may be a Moravec's corner detector-based algorithm, a Harris Corner Detector-based algorithm, a Kanade-Lucas-Tomasi (KLT)-based algorithm, or a Scale Invariant Feature Transform (SIFT)-based algorithm. In order to extract feature points, the marker detector 131 may compare pre-stored information about existing lines to image data to extract feature points.

According to an embodiment, the marker detector 131 may transfer data about all feature points acquired from the first image 1 to the position estimator 132, or may decide positions of the feature points based on the data about the all feature points, and then transfer only data about the decided positions to the position estimator 132. In the latter case, the marker detector 131 may detect, for example, the borders 71a to 71f, 72a to 72f, and 73a to 73f of the line elements 81a to 81c, 82a to 82c, and 83a to 83c, decide positions of the borders 71a to 71f, 72a to 72f, and 73a to 73f in the first image 1, and then transfer data about the decided positions to the position estimator 132.

Successively, after a predetermined time period elapses, the markers on the road located in front of the vehicle 10, for example, the lines 81 to 83 may appear in the second image 2 photographed by the photographing unit 220 at the second time. The marker detector 131 may detect the markers, for example, the lines 81 to 83, the line elements 81a to 81c, 82a to 82c, and 83a to 83c, or the borders 71a to 71f, 72a to 72f, and 73a to 73f, from the second image 2 photographed by the photographing unit 220, using the same method as that used for detecting the corresponding ones from the first image 1. In this case, likewise, the marker detector 131 may detect the markers, for example, the lines 81 to 83, the line elements 81a to 81c, 82a to 82c, and 83a to 83c, or the borders 71a to 71f, 72a to 72f, and 73a to 73f, from the second image 2, using the method of extracting feature points from an image, as described above.

As described above, the marker detector 131 may transfer data about all feature points acquired from the second image 2 to the position estimator 132, or may transfer only data about positions of the feature points to the position estimator 132. For example, the marker detector 131 may transfer data about positions of the borders 71a to 71f, 72a to 72f, and 73a to 73f extracted from the second image 2 in the second image 2, to the position estimator 132.

If the vehicle 10 moves along the lane change route R1, the positions of the markers existing in the first image 1 photographed at the first time, for example, the lines 81 to 83, the line elements 81a to 81c, 82a to 82c, and 83a to 83c, or the borders 71a to 71f, 72a to 72f, and 73a to 73f may become different from the positions of the corresponding markers existing in the second image 2 photographed at the second time, for example, the lines 81 to 83, the line elements 81a to 81c, 82a to 82c, and 83a to 83c, or the borders 71a to 71f, 72a to 72f, and 73a to 73f, according to the movement of the vehicle 10. The change of the markers may be caused by the movement of the vehicle 10, and an amount of change of the markers may correspond to an amount of movement of the vehicle 10.

The position estimator 132 may compare the markers extracted from the at least two images 1 and 2, for example, the borders 71a to 71f, 72a to 72f, or 73a to 73f, and calculate a difference between the markers to thereby acquire an amount of change of the markers. At this time, the position estimator 132 may use a difference in position of the same markers in the two images 1 and 2 to calculate and acquire an amount of change of the markers.

If the amount of change of the markers is acquired, the position estimator 132 may estimate a position based on the amount of change of the markers. The position estimator 132 may calculate a plurality of amounts of change for a plurality of markers, and estimate a first estimated position using the plurality of amounts of change for the markers. At this time, the position estimator 132 may add a predetermined weight value to each amount of change of markers to estimate the first estimated position of the vehicle 10. For example, the position estimator 132 may sum the plurality of amounts of change for the markers to calculate the first estimated position, or may add a predetermined weight value to each amount of change for the markers to sum the resultant amounts of change for the markers to calculate the first estimated position of the vehicle 10, as necessary.

Hereinafter, an example of a method of calculating an amount of change of markers will be described in more detail.

For description, the border 71a located at the leftmost lower part of FIG. 9 is defined as (X1, Y1), and the position of each border is defined as (XN, YN) with respect to the border 71a located at the leftmost lower part, wherein N is a natural number greater than 1. Then, (X1, Y2) represents the border 72a located to the right of the border 71a located at the leftmost lower part, and (X2, Y1) represents the border 71b located in front of the border 71a, that is, located more distant in the front direction from the vehicle 10 than the border 71a. Also, the position of an arbitrary border photographed at the first time is defined as (XN(1), YN(1)), and the position of the same border photographed at the second time is defined as (XN(2), YN(2)). Likewise, the position of the same border photographed at a k time is defined as (XN(k), YN(k)).

Then, a first estimated position of the vehicle 10 at the second time may be calculated by Equation (1), below.

$$(P_x(2), P_y(2)) = (XN(2), YN(2)) - (XN(1), YN(1)) \tag{1}$$

Herein, $(P_x(2), P_y(2))$ represents a coordinate value of the first estimated position of the vehicle 10 at the second time. As such, a difference between a position of the border 71a to 71f, 72a to 72f, or 73a to 73f at the first time and a position of the same border 71a to 71f, 72a to 72f, or 73a to 73f at the second time may be calculated to acquire a relative position of the vehicle 10 with respect to the reference position 92. The relative position of the vehicle 10 can be expressed as Equation (2), below.

$$(P_x(k), P_y(k)) = (XN(k), YN(k)) - (XN(j), YN(j)) \tag{2}$$

Herein, $(P_x(2), P_y(2))$ represents a coordinate value of a first estimated position of the vehicle 10 at a k time. In Equation (2), j and k are different natural numbers selected from a range of 1 to (k−1). For example, in order to calculate the first estimated position of the vehicle 10 from the reference position 92, j may be set to 1. (XN(j), YN(j)) represents a position of the border 71a to 71f, 72a to 72f, or 73a to 73f extracted from a j-th image photographed at a j time.

In this way, the position estimator 132 may calculate a difference between the positions of the same markers in at least two images photographed at at least two times, that is, an amount of change of a marker, thereby calculating a first estimated position which is a relative position of the vehicle 10 with respect to the reference position 92.

If a plurality of markers are detected from each of the first and second images 1 and 2 so that a plurality of amounts of change are calculated, the position estimator 132 may calculate an average value of the plurality of amounts of change to thereby calculate a first estimated position.

Meanwhile, the position estimator 132 may add a weight value to each marker to calculate a first estimated position. In this case, the position estimator 132 may calculate a first estimated position using Equations (3) and (4), below.

$$(P_x(k), P_y(k)) = \sum_{i=1}^{N} \omega_{ik} [(Xi(k), Yi(k)) - (Xi(j), Yi(j))] \tag{3}$$

$$\sum \omega_{ik} = 1 \tag{4}$$

Herein, $\omega_{ik}$ represents a weight value, and a sum of all weight values may be 1 as seen in Equation (4). Meanwhile, j may be set to 1 in order to calculate a first estimated position of the vehicle 10 from the reference position 92, as described above.

As seen in Equations (3) and (4), the position estimator 132 may add a predetermined weight value to each of a plurality of amounts of change of markers to calculate a weighted average for an amount of change of a marker, thereby acquiring a first estimated position.

The position estimator 132 may add a greater weight value to a marker located relatively closer to the vehicle 10 than a marker located relatively more distant from the vehicle 10, in the first and second images 1 and 2, thereby more accurately calculating a first estimated position. In the first and second images 1 and 2, an amount of change of a marker located close to the vehicle 10, for example, an amount of change of the border 71a or 72a located close to the vehicle 10 can more accurately reflect a change in position of the vehicle 10 than the borders 71e, 71f, 72e, 72f, 73e, and 73f located distant from the vehicle 10.

Figure 13:
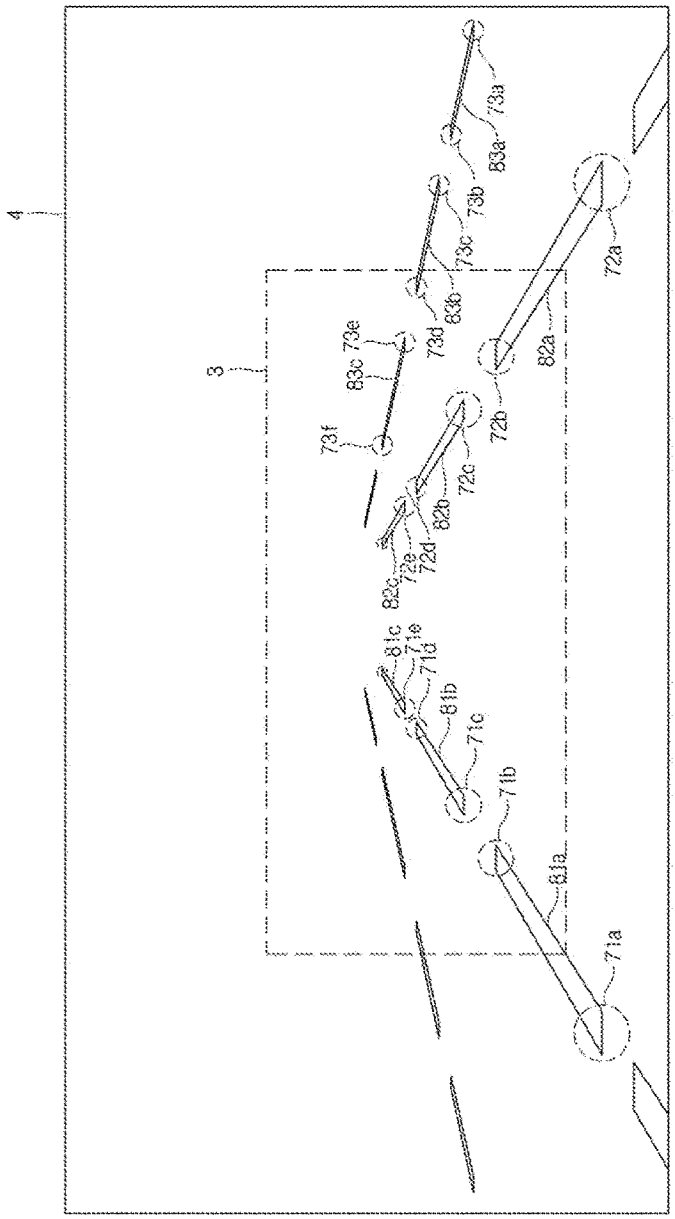
FIG. 13 is a view for describing candidate markers.
Figure 14:
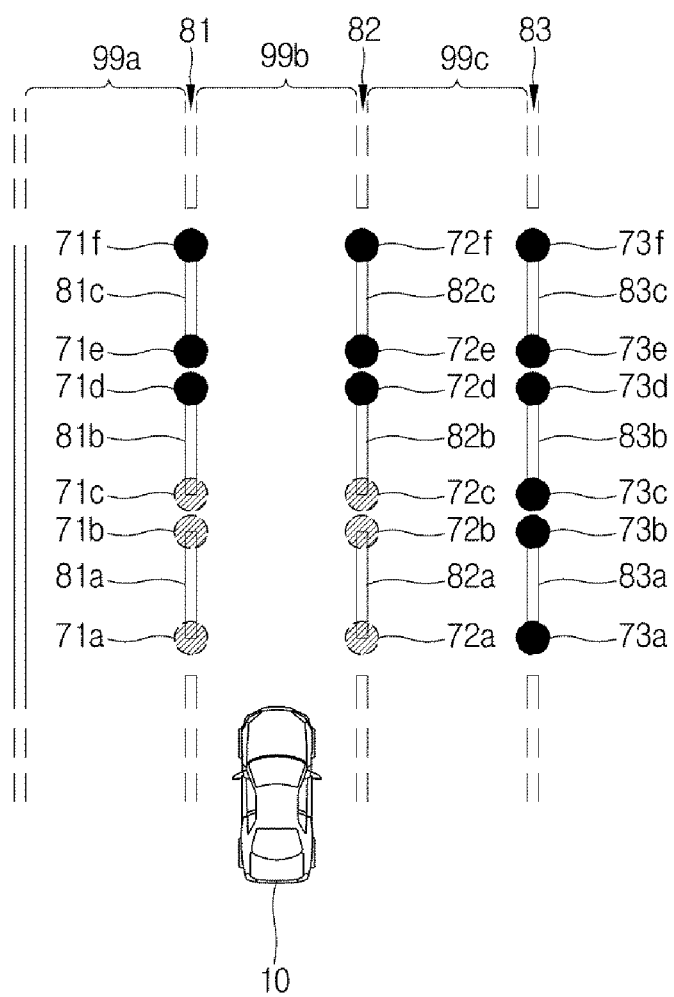
FIGS. 14 and 15 are views for describing changes of candidate markers.
Figure 15:
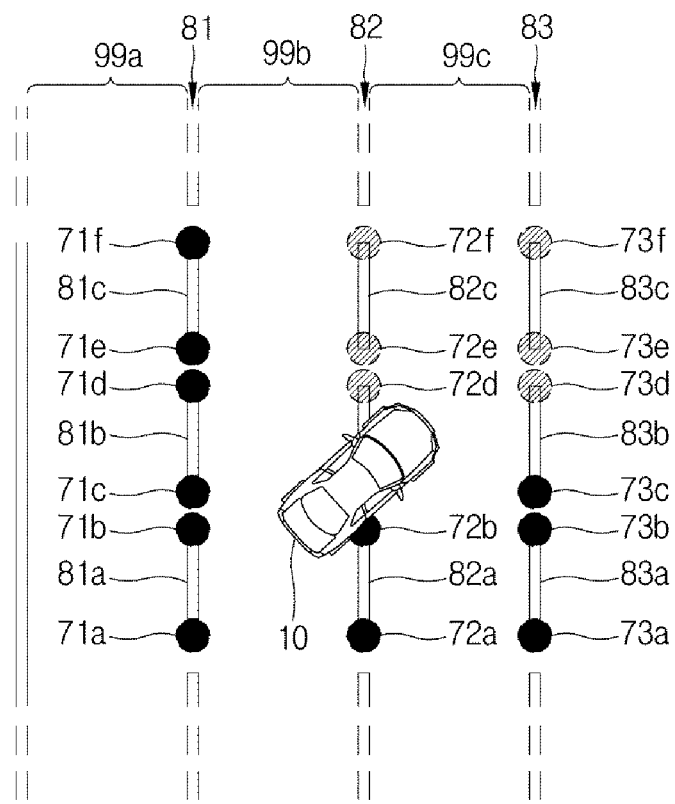

FIG. 13 is a view for describing candidate markers, and FIGS. 14 and 15 are views for describing changes of candidate markers. In FIGS. 14 and 15, circles in whose interiors oblique lines are drawn may represent markers extracted from images, and circles in whose interiors a dark color is painted may represent candidate markers.

According to an embodiment, the position estimator 132 may set a candidate marker, and then acquire a first estimated position based on the candidate marker. The candidate marker may represent a marker having a probability that it will appear on an image according to a movement of the vehicle 10 although it is not extracted from the image yet.

For example, as shown in FIG. 13, an off screen 4 may exist outside a photographed image 3, and the off screen 4 may include a line element 83a or 83b or a border 71a, 73a, 73b, or 73c that can be actually used as a marker although it does not appear on the image 3.

Also, according to another example, the line elements 81a, 81b, 82a, and 82b or the borders 71b, 71c, 71d, 72b, 72c, and 72d close to the vehicle 10 in the photographed image 3 may be extracted from the image 3 by the marker detector 131, however, the line elements 81c, 82c, 83b, and 83c or the borders 71e, 71f, 72e, 72f, 73d, 73e, and 73f not close to the vehicle 10 in the photographed image 3 may be not extracted from the image 3 although the line elements 81c, 82c, 83b, and 83c or the borders 71e, 71f, 72e, 72f, 73d, 73e, and 73f exist in the image 3. The reason may be because the line elements 81c, 82c, 83b, and 83c or the borders 71e, 71f, 72e, 72f, 73d, 73e, and 73f not close to the vehicle 10 appear with small sizes in the image 3, and accordingly, it is difficult to detect them. Also, the reason may be because a designer or a user has set all objects (in this example, the line elements 81c, 82c, 83b, and 83c or the borders 71e, 71f, 72e, 73d, 73e, and 73f) not close to the vehicle 10 to be not detected, in consideration of the throughput, processing speed, etc. of a processor.

Such non-detected markers may be newly detected from another image according to movement of the vehicle 10. More specifically, markers, for example, the line elements 81c, 82c, 83a, 83b, and 83c or the borders 71e, 72e, 73a, 73b, 73c, 73d, 73e, and 73f not close to the vehicle 10 and not detected by the marker detector 131 from the first image 1 photographed at the first time may be, after the vehicle 10 moves, detected from the second image 2 photographed at the second time. For example, some borders 72d, 72e, 72f, 73d, 73e, and 73f of a plurality of borders may be not detected by the marker detector 131, as shown in FIG. 14, and may be, after the vehicle 10 moves, detected by the marker detector 131, as shown in FIG. 15

The position estimator 132 may virtually decide candidate markers having a probability that they can be detected from an image according to an elapse of time although they were not detected by the marker detector 131, in advance, in order to more accurately estimate the first estimated position of the vehicle 10. For example, the position estimator 132 may estimate borders 72d, 72e, 72f, 73d, 73e, and 73f that are to be detected from an image by the marker detector 131 according to movement of the vehicle 10, in advance, and decide the estimated borders 72d, 72e, 72f, 73d, 73e, and 73f as candidate markers. In other words, the position estimator 132 may virtually estimate markers (that is, candidate markers) that can be extracted from a second image that is to be photographed at a second time, in advance, before the second time, and then calculate a first estimated position using the candidate markers.

The candidate markers may be decided based on actually detected markers, for example, the line elements 81a, 81b, 82a, and 82b or the borders 71b, 71c, 71d, 72b, 72c, and 72d. For example, the position estimator 132 may estimate and decide candidate markers on a road, using positions of markers extracted from the first image 1 photographed at the first time, and distances between the extracted markers. More specifically, the position estimator 132 may calculate candidate markers using positions of the extracted line elements 81a, 81b, 82a, and 82b or the borders 71b, 71c, 71d, 72b, 72c, and 72d, and distances between the extracted line elements 81a, 81b, 82a, and 82b or the borders 71b, 71c, 71d, 72b, 72c, and 72d.

According to an embodiment, the position estimator 132 may read pre-stored data to virtually decide candidate markers. At this time, the position estimator 132 may compare the previously detected line elements 81a 81b, 82a, and 82b or the previously detected borders 71b, 71c, 71d, 72b, 72c, and 72d to pre-stored data to thus decide candidate markers.

According to an embodiment, the position estimator 132 may decide candidate markers several times. In other words, the position estimator 132 may decide a first candidate marker using a marker detected from the first image 1, and decide a second candidate marker using a marker detected from the second image 2. If the first candidate marker indicates the same object (for example, the same line or the same border) as the second candidate marker, the position estimator 132 may use the first and second candidate markers to decide a first estimated position. More specifically, the position estimator 132 may calculate a first estimated position using an amount of change of at least one candidate marker. At this time, the position estimator 132 may consider the first and second candidate markers as real markers, and decide a first estimated position of the vehicle 10 using Equations (1) to (4).

Also, if a real marker corresponding to the candidate marker is detected from a real image photographed by the photographing unit 220 according to an elapse of time, the position estimator 132 may compare the candidate marker to the real marker to decide a first estimated position. If an object indicated by the candidate marker is the same object as that indicated by the real marker, the position estimator 132 may calculate a first estimated position of the vehicle 10, using the candidate marker and the real marker, as described above. In other words, the position estimator 132 may calculate an amount of change between the real marker corresponding to the candidate marker and the candidate marker determined in advance before the real marker is acquired, to thus calculate a first estimated position. For example, the position estimator 132 may consider the candidate marker as an actually acquired marker, and decide a first estimated position of the vehicle 10 using Equations (1) to (4).

The second estimated position determiner 140 may decide a second estimated position based on information transferred from the operation sensor 230. The second estimated position may be an estimated position calculated based on information about driving of the vehicle 10. According to an embodiment, the second estimated position determiner 140 may calculate a second estimated position using dead reckoning as described above. In other words, the second estimated position determiner 140 may calculate a current relative position of the vehicle 10 with respect to a start position or a reference position, using data about, or from, at least one of a steering angle $\theta$ and driving velocity v of the vehicle 10, transferred from the operation sensor 230.

The final estimated position determiner 150 may decide a final estimated position using the first estimated position decided by the first estimated position determiner 130 and the second estimated position decided by the second estimated position determiner 140.

According to an embodiment, the final estimated position determiner 150 may correct the second estimated position using the first estimated position to decide a final estimated position, or may calculate an intermediate position between the first estimated position and the second estimated position to decide a final estimated position.

According to another embodiment, the final estimated position determiner 150 may acquire a final estimated position using the Kalman filter. In this case, the final estimated position determiner 150 may decide a final estimated position based on at least one of the first estimated position and the second estimated position. For example, the final estimated position determiner 150 may use an estimated value as the first estimated position, use a currently measured value as the second estimated position, and then apply the first and second estimated positions to the Kalman filter to thereby decide a final estimated position. The final estimated position determiner 150 may update a Kalman gain and covariance using the first and second estimated positions.

The vehicle operation decider 160 may decide an operation of the vehicle 10, for example, whether to change a driving velocity v or a steering angle θ, based on the final estimated position. If it is determined that the final estimated position exists on the lane change route R1, the vehicle operation decider 160 may determine that there is no problem in changing a lane, and transfer the result of the determination to the control signal generator 170. Meanwhile, if it is determined that the final estimated position has departed from the lane change route R1 or has a probability of departing from the lane change route R1, the vehicle operation decider 160 may determine that there is a problem in changing a lane, and transfer the result of the determination to the control signal generator 170.

The control signal generator 170 may generate various kinds of control signals related to an operation of the vehicle 10, and transfer the control signals to the corresponding components. The control signal generator 170 may transfer the control signals to the steering system 240 or the acceleration system 250 to control the vehicle 10 to be steered in a predetermined direction, to accelerate, or to decelerate.

The control signal generator 170 may transfer a control signal to the steering system 240 or the acceleration system 250 so that the vehicle 10 changes a lane along the lane change route R1. At this time, the control signal generator 170 may generate a control signal according to a predetermined control pattern, and transfer the control signal to the steering system 240 or the acceleration system 250.

If the result of determination is that there is no problem in changing a lane, and such a result is received from the vehicle operation decider 160 while the vehicle 10 changes a lane, the control signal generator 170 may maintain a current control pattern to control the steering system 240 or the acceleration system 250.

In contrast, if the result of determination is that there is a problem in changing a lane, and such a result is received from the vehicle operation decider 160 while the vehicle 10 changes a lane, the control signal generator 170 may generate a new control signal that is different from the current control pattern, and transfer the new control signal to the steering system 240 or the acceleration system 250, so that the vehicle 10 can again enter the lane change route R1 or keep travelling along the lane change route R1.

According to an embodiment, the control signal generator 170 may further generate a control signal for the turn signal indicator 260 of the vehicle 10. If the vehicle 10 starts changing a lane, the control signal generator 170 may generate a control signal for flickering, or otherwise activating, the turn signal indicator 260, and transfer the control signal to the turn signal indicator 260. The turn signal indicator 260 may be controlled to keep flickering until the vehicle 10 finishes changing a lane.

Hereinafter, an embodiment of a method of controlling the vehicle 10 will be described.

Figure 16:
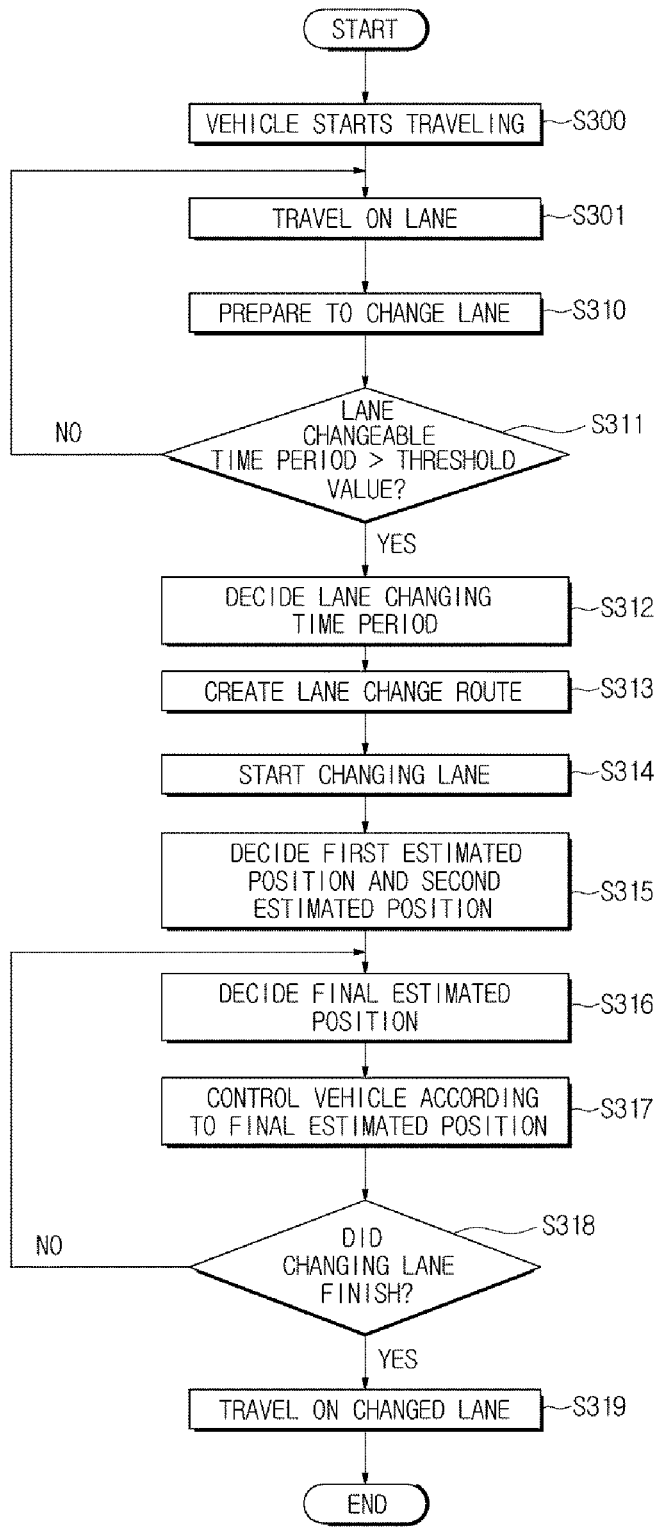
FIG. 16 is a flowchart illustrating a vehicle control method according to an embodiment of the present disclosure.

FIG. 16 is a flowchart illustrating a vehicle control method according to an embodiment of the present disclosure.

According to the vehicle control method shown in FIG. 16, first, the vehicle 10 may start traveling, in operation S300. At this time, the vehicle 10 may be in a manual driving state or in an automatic driving state, according to a driver's condition.

When the vehicle 10 enters a road, the vehicle 10 may enter a predetermined lane 99a, and then travel along the lane 99a, in operation S301.

While traveling along the lane 99a, the vehicle 10 may need to change from lane 99a to another lane 99b. In this case, the vehicle 10 may prepare to change a lane, in operation S310.

The vehicle 10 may determine whether another vehicle exists around the side or side-rear part of the vehicle 10, and determine whether the vehicle 10 can change a lane, according to the result of the determination. At this time, the vehicle 10 may decide a lane changeable time period, and determine whether the lane changeable time period is longer or shorter than a predetermined threshold value, in operation S311. If the vehicle 10 determines that the lane changeable time period is longer than the predetermined threshold value ("Yes" in operation S311), the vehicle 10 may decide a lane changing time, in operation S312. If the vehicle 10 determines the lane changeable time period is shorter than the predetermined threshold value ("No" in operation S311), the vehicle 10 may wait until the vehicle 10 can change a lane, while keeping travelling along the lane 99a, in operation S301.

The vehicle 10 may create a lane change route R1 for moving from its current position 92 to a decided destination position 91, in operation S313. Creating the lane change route R1 in operation S313 may be performed earlier than the deciding a lane changeable time period and/or the deciding a lane changing time.

If the lane changing time and the lane change route R1 are all decided, the vehicle 10 may start changing the lane 99a automatically for the lane changing time, in operation S314. The vehicle 10 may travel along the lane change route R1 to change from the lane 99a to the lane 99b, under the control of the vehicle controller 100.

While traveling along the lane change route R1, the vehicle 10 may determine whether the vehicle 10 properly travels along the lane change route R1 or departs from the lane change route R1.

In order to determine whether the vehicle 10 properly travels along the lane change route R1 or departs from the lane change route R1, the vehicle 10 may decide a final estimated position. In order to decide a final estimated position, the vehicle 10 may decide a first estimated position and a second estimated position, in operation S315. The first estimated position may be an estimated position for a relative position of the vehicle 10, calculated using markers detected from first and second images 1 and 2, and the second estimated position may be an estimated position calculated based on information about driving the vehicle 10.

The first estimated position may be acquired using a plurality of markers detected from a plurality of images photographed by the photographing unit 220. The plurality of markers may include lines drawn on the road.

In order to calculate the first estimated position, the vehicle 10 may detect at least two markers from at least two images 1 and 2 among the plurality of images photographed by the photographing unit 220, calculate a difference between the two markers to acquire an amount of change of the markers and calculate a first estimated position using the amount of change of the markers. Herein, the first estimated position may be a relative position of the vehicle 10 with respect to a reference position. For example, the vehicle 10 may calculate the first estimated position according to Equation (1) and Equation (2).

According to an embodiment, if amounts of change of a plurality of markers are calculated, an average value of the amounts of change of the plurality of markers may be calculated, and a first estimated position may be calculated based on the average value. In this case, as seen in Equation (3) and Equation (4), a predetermined weight value may be added to each amount of change for the markers, a weighted average for the amounts of change of the markers may be calculated, and a first estimated position may be calculated using the weighted average. Also, the weighted average may be calculated in such a way as to add a relatively greater weight value to an amount of change of a marker calculated based on a marker located relatively closer to the vehicle 10, and to add a relatively smaller weight value to an amount of change of a marker calculated based on a marker located relatively more distant from the vehicle 10.

According to an embodiment, the vehicle 10 may further decide at least one candidate marker, and calculate a first estimated position of the vehicle 10 using the decided candidate marker. At this time, the vehicle 10 may decide at least one candidate marker using a marker actually acquired from images 1 to 3.

If the at least one candidate marker is decided, the vehicle 10 may calculate a first estimated position using an amount of change of the at least one candidate marker. More specifically, the vehicle 10 may calculate an amount of change between the same candidate markers of a plurality of candidate markers acquired from different images to thus calculate a first estimated position of the vehicle 10. Also, the vehicle 10 may calculate an amount of change between a real marker acquired from the next image and corresponding to the candidate marker and the candidate marker determined in advance before the real marker is acquired, to thus calculate a first estimated position of the vehicle 10.

Also, the vehicle 10 may calculate a second estimated position that is a relative position of the vehicle 10 with reference to a reference position, using a steering angle θ or a driving velocity v of the vehicle 10 transferred from the operation sensor 230. At this time, the vehicle 10 may estimate the second estimated position using dead reckoning.

If the first estimated position and the second estimated position are calculated, the vehicle 10 may decide a final estimated position based on the first estimated position and the second estimated position, in operation S316. According to an embodiment, the vehicle 10 may correct the second estimated position using the first estimated position to decide a final estimated position, or may calculate an intermediate position between the first estimated position and the second estimated position to decide a final estimated position. Also, the vehicle 10 may calculate and decide a final estimated position using the Kalman filter.

If the final estimated position is decided, the vehicle 10 may be controlled according to the final estimated position, in operation S317. More specifically, if the vehicle 10 determines that the final estimated position exists on the lane change route R1, the vehicle 10 may determine that there is no problem in changing a lane, and keep changing the lane 99a according to a current control pattern. In contrast, if the vehicle 10 determines that the final estimated position has departed from the lane change route R1 or has probability of departing from the lane change route R1, the vehicle 10 may determine that there is a problem in changing a lane, and again enter the lane change route R1 or perform control operation for preventing departure from the lane change route R1.

Operation S315 of deciding the first estimated position and the second estimated position, operation S316 of deciding the final estimated position, and operation S317 of controlling the vehicle 10 according to the final estimated position may be performed until the vehicle 10 finishes changing the lane 99a, in operation S318.

After the vehicle 10 finishes changing from lane 99a to the lane 99b according to the above-described operations ("Yes" in operation S318), the vehicle 10 may travel on the changed lane 99b, in operation S319.

According to the vehicle and the method of controlling the vehicle, as described above, it is possible to more accurately estimate a relative position of the vehicle on the traveling route of the vehicle.

According to the vehicle and the method of controlling the vehicle, as described above, it is possible to stably control the vehicle when the vehicle changes lanes, resulting in improvement of a driving safety of the vehicle.

According to the vehicle and the method of controlling the vehicle, as described above, since a plurality of candidate markers can be acquired, it is possible to more accurately estimate and measure a position of the vehicle even after a lane change route is created.

According to the vehicle and the method of controlling the vehicle, as described above, since it is unnecessary to acquire an accurate absolute position of the vehicle in controlling the vehicle, it is possible to easily control the vehicle in a busy city environment.

According to the vehicle and the method of controlling the vehicle, as described above, since a relative position of the vehicle can be acquired by detecting lines, it is possible to accurately detect and determine a position of an autonomous vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
 a photographing unit for acquiring a plurality of images of a road; and
 a vehicle controller detecting a line formed on the road from the plurality of images, deciding a first estimated position of the vehicle using an amount of change of the line in the plurality of images, deciding a second estimated position of the vehicle based on information about driving of the vehicle, and deciding a final estimated position of the vehicle using the first estimated position and the second estimated position.

2. The vehicle according to claim 1, wherein the vehicle controller detects two lines from two images of the plurality of images, and acquires a difference between the two lines to acquire the amount of change of the line in the plurality of images.

3. The vehicle according to claim 2, wherein the vehicle controller decides the first estimated position of the vehicle using the amount of change of the line, or calculates an average value of amounts of change of a plurality of lines to decide the first estimated position of the vehicle.

4. The vehicle according to claim 3, wherein the vehicle controller decides the first estimated position of the vehicle by adding a weight value to each of the amounts of change of the plurality of lines to calculate a weighted average of the amounts of change of the plurality of lines.

5. The vehicle according to claim 4, wherein the vehicle controller adds a greater weight value to an amount of change of a line calculated for a detected line located relatively closer to the vehicle in the plurality of images to calculate the weighted average of the amounts of change of the plurality of lines.

6. The vehicle according to claim 1, wherein the vehicle controller decides the final estimated position by correcting the second estimated position using the first estimated position.

7. The vehicle according to claim 1, wherein the vehicle controller acquires at least one first real line from at least one first image among the plurality of images, and acquires at least one candidate line based on the at least one first real line.

8. The vehicle according to claim 7, wherein the vehicle controller decides the first estimated position of the vehicle using an amount of change of the at least one candidate line.

9. The vehicle according to claim 7, wherein a second real line is acquired from a second image photographed successively after the first image is photographed, among the plurality of images, and the second real line corresponds to a first candidate line of the at least one candidate line.

10. The vehicle according to claim 9, wherein the vehicle controller calculates the amount of change of the line in the plurality of images, using a difference between the first candidate line and the second real line, and decides the first estimated position of the vehicle using the amount of change of the line.

11. The vehicle according to claim 1, further comprising a side and rear sensor sensing another vehicle existing around a side-rear part of the vehicle.

12. The vehicle according to claim 11, wherein the vehicle controller determines whether the vehicle is able to change a lane and decides a lane changeable time period, based on the result of the sensing by the side and rear sensor.

13. The vehicle according to claim 12, wherein if the vehicle controller determines whether the vehicle is able to change the lane and decides the lane changeable time period, the vehicle controller creates a lane change route.

14. The vehicle according to claim 13, wherein if the vehicle controller creates the lane change route, the vehicle controller determines whether the vehicle has departed from the lane change route, based on the final estimated position of the vehicle decided using the first estimated position and the second estimated position.

15. A method of controlling a vehicle, comprising:
deciding an estimated position of the vehicle based on information about driving of the vehicle;
acquiring a plurality of images of a road;
detecting a line formed on the road from the plurality of images;
deciding another estimated position of the vehicle using an amount of change of the line in the plurality of images; and
deciding a final estimated position of the vehicle using the estimated position and the other estimated position.

16. The method according to claim 15, wherein the step for deciding the first estimated position of the vehicle using the amount of change of the line in the plurality of images comprises: detecting two lines from two images of the plurality of images, and acquiring a difference between the two lines to acquire the amount of change of the line in the plurality of images.

17. The method according to claim 16, wherein the step for deciding the other estimated position of the vehicle using the amount of change of the line in the plurality of images further comprises: deciding the other estimated position of the vehicle using the amount of change of the line, or calculating an average value of amounts of change of a plurality of lines to decide the other estimated position of the vehicle.

18. The method according to claim 17, wherein the step for deciding the other estimated position of the vehicle using the amount of change of the line in the plurality of images comprises deciding the other estimated position of the vehicle by adding a weight value to each of the amounts of change of the plurality of lines to calculate a weighted average of the amounts of change of the plurality of lines.

19. The method according to claim 18, wherein the step for deciding the other estimated position of the vehicle by adding the weight value to each of the amounts of change of the plurality of lines to calculate the weighted average of the amounts of change of the plurality of lines comprises deciding the other estimated position of the vehicle by adding a greater weight value to an amount of change of a line calculated for a detected line located relatively closer to the vehicle to calculate the weighted average of the amounts of change of the plurality of lines.

20. The method according to claim 15, wherein the step for deciding the final estimated position of the vehicle using the estimated position and the other estimated position comprises deciding the final estimated position by correcting the estimated position decided based on the information about driving of the vehicle using the other estimated position.

21. The method according to claim 15, wherein the step for deciding the other estimated position of the vehicle using the amount of change of the line in the plurality of images comprises acquiring at least one first real line from at least one first image among the plurality of images, and acquiring at least one candidate line based on the at least one first real line.

22. The method according to claim 21, wherein the step for deciding the other estimated position of the vehicle using the amount of change of the line in the plurality of images further comprises deciding the other estimated position of the vehicle using an amount of change of the at least one candidate line.

23. The method according to claim 22, wherein the step for deciding the other estimated position of the vehicle using the amount of change of the line in the plurality of images comprises acquiring a second real line from a second image photographed successively after the first image is photographed, among the plurality of images, wherein the second real line corresponds to a first candidate line of the at least one candidate line.

24. The method according to claim 23, wherein the step for deciding the other estimated position of the vehicle using the amount of change of the line in the plurality of images further comprises calculating the amount of change of the line in the plurality of images, using a difference between the first candidate line and the second real line, and deciding the first estimated position of the vehicle using the amount of change of the line.

25. The method according to claim 15, further comprising sensing another vehicle existing around a side-rear part of the vehicle.

26. The method according to claim 25, further comprising determining whether the vehicle is able to change a lane and deciding a lane changeable time period, based on the result of the sensing another vehicle existing around a side-rear part of the vehicle.

27. The method according to claim 26, further comprising creating a lane change route if whether the vehicle is able to change the lane is determined and the lane changeable time period is decided.

28. The method according to claim 27, further comprising determining whether the vehicle has departed from the lane change route, based on the final estimated position of the vehicle decided using the plurality of estimated positions.

* * * * *